US012795144B2

(12) United States Patent

Kuo et al.

(10) Patent No.: US 12,795,144 B2

(45) Date of Patent: Nov. 10, 2026

(54) METHOD AND APPARATUS FOR CROSS-COMPONENT PREDICTION FOR VIDEO CODING

(71) Applicant: BEIJING DAJIA INTERNET INFORMATION TECHNOLOGY CO., LTD., Beijing (CN)

(72) Inventors: Che-Wei Kuo, Beijing (CN); Xiaoyu Xiu, San Diego, CA (US); Ning Yan, Hangzhou (CN); Hong-Jheng Jhu, Beijing (CN); Wei Chen, San Diego, CA (US); Han Gao, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/914,404

(22) Filed: Oct. 14, 2024

(65) Prior Publication Data

US 2025/0047886 A1 Feb. 6, 2025

Related U.S. Application Data

(63) Continuation of application No. PCT/US2023/018510, filed on Apr. 13, 2023.

(Continued)

(51) Int. Cl.

*H04N 19/50* (2014.01)
*H04N 19/176* (2014.01)
*H04N 19/186* (2014.01)

(52) U.S. Cl.

CPC .......... *H04N 19/50* (2014.11); *H04N 19/176* (2014.11); *H04N 19/186* (2014.11)

(58) Field of Classification Search

None

See application file for complete search history.

(56) References Cited

U.S. PATENT DOCUMENTS

2018/0124400 A1 5/2018 He et al.
2018/0367814 A1 12/2018 Seregin et al.

(Continued)

OTHER PUBLICATIONS

International Search Report and Written Opinion dated Jul. 5, 2023, issued in counterpart Application No. PCT/US2023/18510. (13 pages).

(Continued)

*Primary Examiner* — Nam D Pham

(74) *Attorney, Agent, or Firm* — Oblon, McClelland, Maier & Neustadt, L.L.P.

(57) ABSTRACT

A method for decoding video data, comprising: obtaining internal luma sample values of a video block from a bitstream, obtaining neighboring luma and chroma sample values of the video block; calculating first filtered values based on the neighboring luma sample values for each direction of a number of directions, wherein each of the first filtered values is calculated based on sample differences between luma sample values in the direction, accumulating the first filtered values for each direction of number of directions respectively to obtain accumulated values; determining a direction of number of directions for which an accumulated value is the largest one of the accumulated values among the number of directions, applying the determined direction as a direction for predicting internal chroma sample values of video block based on the internal luma sample values of the video block, and obtaining decoded video block using the predicted internal chroma sample values.

19 Claims, 26 Drawing Sheets

Related U.S. Application Data

(60) Provisional application No. 63/330,604, filed on Apr. 13, 2022.

(56) References Cited

U.S. PATENT DOCUMENTS

| | | | | |
|---|---|---|---|---|
| 2020/0244956 A1* | 7/2020 | Lee | ...................... | H04N 19/132 |
| 2021/0227250 A1* | 7/2021 | Liu | ...................... | H04N 19/513 |
| 2022/0070491 A1 | 3/2022 | Yasugi et al. | | |

OTHER PUBLICATIONS

Li (Alibaba-Inc) X et al: "Non-EE2: On chroma intra prediction mode", 25. JVET Meeting; Jan. 12, 2022-Jan. 21, 2022; Teleconference; (The Joint Video Exploration Team of ISC/IEC JTC1/SC29/WG11 and ITU-T SG.16 ), No. JVET-Y0092 Jan. 13, 2022 (Jan. 13, 2022), XP030300346 (4 pages).

Li (Alibaba-Inc) X et al.: "EE2-1.2: On chroma intra prediction", 26. JVET Meeting; Apr. 20, 2022-Apr. 29, 2022; Teleconference; (The Joint Video Exploration Team of ISO/IEC JTC1/SC29/WG11 and ITU-T SG.16 ), No. JVET-20051 ; m59352 Apr. 13, 2022 (Apr. 13, 2022), XP030300799 (6 pages).

Zhang K et al: "Enhanced Cross-component Linear Model Intra-prediction", 4. JVET Meeting; Oct. 15, 2016-Oct. 21, 2016; Chengdu; (The Joint Video Exploration Team of ISO/IEC JTC1/SC29/WG11 and ITU-T SG.16 ); No. JVET-D0110-v4, Oct. 17, 2016 (Oct. 17, 2016), XP030150355 (6 pages).

* cited by examiner

METHOD AND APPARATUS FOR CROSS-COMPONENT PREDICTION FOR VIDEO CODING

CROSS-REFERENCE TO RELATED APPLICATION

This application is a continuation of PCT Application No. PCT/US2023/018510, entitled "METHOD AND APPARATUS FOR CROSS-COMPONENT PREDICTION FOR VIDEO CODING" filed on Apr. 13, 2023, which claims the benefit of U.S. Provisional Applications No. 63/330,604 filed on Apr. 13, 2022. The entire contents thereof are incorporated herein by reference in its entirety.

FIELD

Aspects of the present disclosure relate generally to image/video coding and compression, and more particularly, to methods and apparatus for cross-component prediction technology.

BACKGROUND

Various video coding techniques may be used to compress video data. Video coding is performed according to one or more video coding standards. For example, video coding standards include versatile video coding (VVC), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

The following presents a simplified summary of one or more aspects according to the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect of the present disclosure, there is provided a method for decoding video data, comprising: obtaining internal luma sample values of a video block from a bitstream; obtaining neighboring luma and chroma sample values of the video block; calculating first filtered values based on the neighboring luma sample values for each direction of a number of directions, wherein each of the first filtered values is calculated based on sample differences between luma sample values in the direction of the number of directions; accumulating the first filtered values for each direction of the number of directions respectively to obtain accumulated values; determining a direction of the number of directions for which an accumulated value is the largest one of the accumulated values among the number of directions; applying the determined direction as a direction for predicting internal chroma sample values of the video block based on the internal luma sample values of the video block; and obtaining decoded video block using the predicted internal chroma sample values.

According to another aspect of the present disclosure, there is provided a method for encoding video data, comprising: obtaining internal luma sample values of a video block; obtaining neighboring luma and chroma sample values of the video block; calculating first filtered values based on the neighboring luma sample values for each direction of a number of directions, wherein each of the first filtered values is calculated based on sample differences between luma sample values in the direction of the number of directions; accumulating the first filtered values for each direction of the number of directions respectively to obtain accumulated values; determining a direction of the number of directions for which an accumulated value is the largest one of the accumulated values among the number of directions; applying the determined direction as a direction for predicting internal chroma sample values of the video block based on the internal luma sample values of the video block; and generating a bitstream comprising encoded video block by using the predicted internal chroma sample values.

According to one aspect of the present disclosure, there is provided a method for decoding video data, comprising: obtaining internal luma sample values of a video block from a bitstream; obtaining neighboring luma and chroma sample values of the video block; performing at least one pre-operation to the neighboring luma sample values and to the internal luma sample values of the video block, to obtain pre-operated neighboring and internal luma sample values, wherein performing the at least one pre-operation comprises calculating sample differences based on the neighboring and internal luma sample values; deriving a linear model by using the pre-operated neighboring luma sample values and the neighboring chroma sample values; determining first internal chroma sample values of the video block by applying the linear model to the corresponding pre-operated internal luma sample values; determining second internal chroma sample values of the video block based on another prediction mode; and obtaining decoded video block by applying weights to the first internal chroma sample values and the second internal chroma sample values respectively.

According to another aspect of the present disclosure, there is provided a method for encoding video data, comprising: obtaining internal luma sample values of a video block; obtaining neighboring luma and chroma sample values of the video block; performing at least one pre-operation to the neighboring luma sample values and to the internal luma sample values of the video block, to obtain pre-operated neighboring and internal luma sample values, wherein performing the at least one pre-operation comprises calculating sample differences based on the neighboring and internal luma sample values; deriving a linear model by using the pre-operated neighboring luma sample values and the neighboring chroma sample values; determining first internal chroma sample values of the video block by applying the linear model to the corresponding pre-operated internal luma sample values; determining second internal chroma sample values of the video block based on another prediction mode; and generating a bitstream comprising encoded video block by applying weights to the first internal chroma sample values and the second internal chroma sample values respectively.

According to an embodiment, there is provided a computer system, comprising: one or more processors; and one or more storage devices storing computer-executable instructions that, when executed, cause the one or more processors to perform the operations of the method of the present disclosure.

According to an embodiment, there is provided a computer program product, storing computer-executable instructions that, when executed, cause one or more processors to perform the operations of the method of the present disclosure.

According to an embodiment, there is provided a computer readable medium, storing computer-executable instructions that, when executed, cause one or more processors to receive a bitstream and perform the operations of the method of the present disclosure based on the bitstream.

According to an embodiment, there is provided a computer readable medium, storing computer-executable instructions that, when executed, cause one or more processors to perform the operations of the method of the present disclosure and transmit a bitstream comprising encoded video information associated with the predicted chroma samples.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently. Joint Video Exploration Team (JVET) under the collaboration of ITU-T VCEG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

Figure 1:
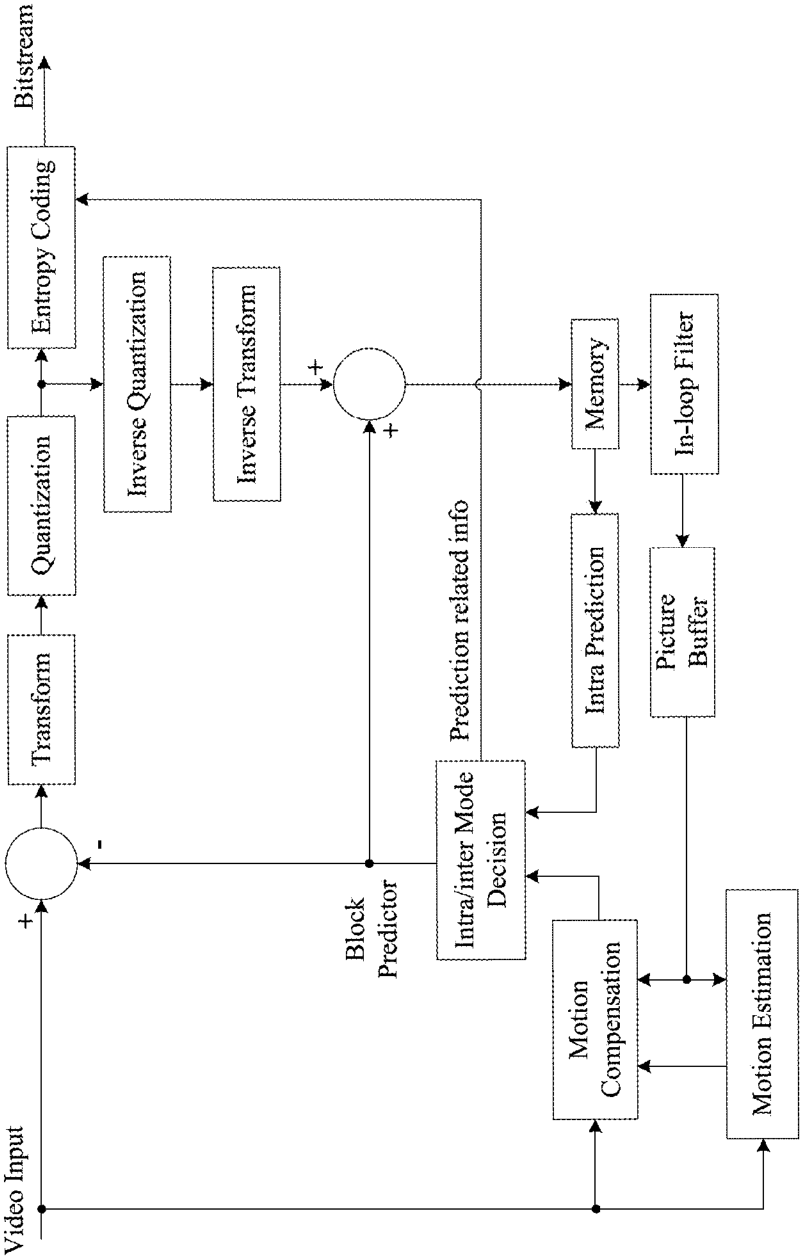
FIG. 1 illustrates a block diagram of a generic block-based hybrid video encoding system.
Figure 2A:
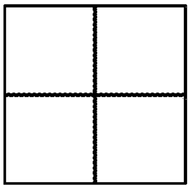
FIGS. 2A, 2B, 2C, 2D, and 2E illustrate five splitting types, comprising quaternary partitioning, horizontal binary partitioning, vertical binary partitioning, horizontal ternary partitioning, and vertical ternary partitioning.
Figure 2B:
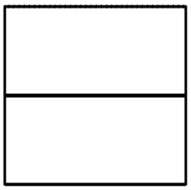
Figure 2C:
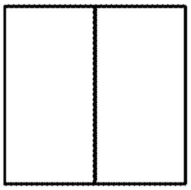
Figure 2D:
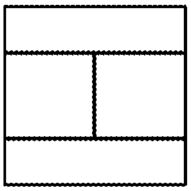
Figure 2E:
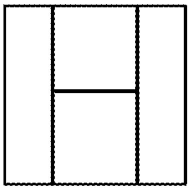

Similar to all the preceding video coding standards, the ECM is built upon the block-based hybrid video coding framework. FIG. 1 illustrates a block diagram of a generic block-based hybrid video encoding system. The input video signal is processed block by block (called coding units (CUs)). In ECM-1.0, a CU can be up to 128×128 pixels. However, same to the VVC, one coding tree unit (CTU) is split into CUs to adapt to varying local characteristics based on quad/binary/ternary-tree. In the multi-type tree structure, one CTU is firstly partitioned by a quad-tree structure. Then, each quad-tree leaf node can be further partitioned by a binary and ternary tree structure. As shown in FIGS. 2A, 2B, 2C, 2D, and 2E, there are five splitting types, quaternary partitioning, vertical binary partitioning, horizontal binary partitioning, vertical extended quaternary partitioning, and horizontal extended quaternary partitioning.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

Figure 3:
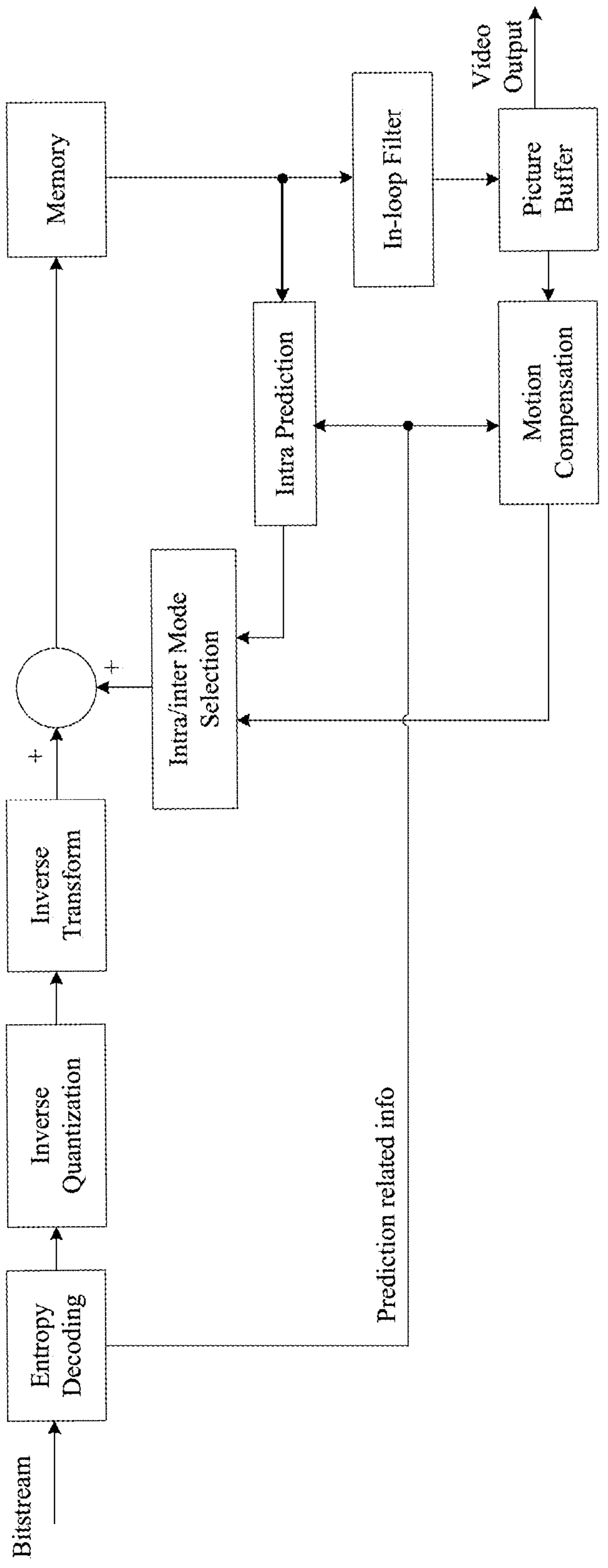
FIG. 3 illustrates a general block diagram of a block-based video decoder.

FIG. 3 illustrates a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

The main focus of this disclosure is to further enhance the coding efficiency of the coding tool of cross-component prediction, cross-component linear model (CCLM), that is applied in the ECM. In the following, some related coding tools in the ECM are briefly reviewed. After that, some deficiencies in the existing design of CCLM are discussed. Finally, the solutions are provided to improve the existing CCLM prediction design.

Cross-Component Linear Model Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i,j) = \alpha \cdot rec_L'(i,j) + \beta \tag{1}$$

where $pred_C(i, j)$ represents the predicted chroma samples in a CU, and $rec_L'$ (i, j) represents the down-sampled reconstructed luma samples of the same CU which are obtained by performing down-sampling on the reconstructed luma samples $rec_L(i, j)$. The above α and β are linear model parameters which are derived from at most four neighboring chroma samples and their corresponding down-sampled luma samples, which may be referred to as neighboring luma-chroma sample pairs. Suppose that a current chroma block has a size of W×H, then W' and H' are obtained as follows:

W=W. H'=H when LM mode is applied;

W'=W+H when LM-A mode is applied;

H'=H+W when LM-L mode is applied;

where in the LM mode, above samples and left samples of the CU are used together to calculate the linear model coefficients; in the LM_A mode, only the above samples of the CU are used to calculate the linear model coefficients; and in the LM_L mode, only the left samples of the CU are used to calculate the linear model coefficients.

If locations of above neighboring samples of a chroma block are denoted as S[0, −1] . . . S[W'−1, −1] and locations of left neighboring samples of the chroma block are denoted as S[−1, 0] . . . . S[−1, H'−1], positions of four neighboring chroma samples are selected as follows:

S[W'/4, −1], S[3*W'/4, −1], S[−1, H'/4], S[−1, 3*H'/4] are selected as the positions of the four neighboring chroma samples when LM mode is applied and both above and left neighboring samples are available;

S[W'/8, −1], S[3*W'/8, −1], [5*W'/8, −1], S[7*W'/8, −1] are selected as the positions of the four neighboring chroma samples when LM-A mode is applied or only the above neighboring samples are available;

S[−1, H'/8], S[−1, 3*H'/8], S[−1, 5*H'/8], S[−1, 7*H'/8] are selected as the positions of the four neighboring chroma samples when LM-L mode is applied or only the left neighboring samples are available.

The four neighboring luma samples corresponding to the selected locations are obtained by a down-sampling operation and the obtained four neighboring luma samples are compared four times to find two larger values: $x_A^0$ and $x_A^1$, and two smaller values: $x_B^0$ and $x_B^1$. Chroma sample values corresponding to the two larger values and the two smaller values are denoted as $y_A^0$, $y_A^1$, $y_B^0$ and $y_B^1$ respectively. Then $X_a$, . . . $X_b$, $Y_a$, and $Y_b$ are derived as:

$$X_a = (x_A^0 + x_A^1 + 1) \gg 1; \tag{2}$$

$$X_b = (x_B^0 + x_B^1 + 1) \gg 1;$$

$$Y_a = (y_A^0 + y_A^1 + 1) \gg 1;$$

$$Y_b = (y_B^0 + y_B^1 + 1) \gg 1$$

-continued $$\alpha = \frac{Y_a - Y_b}{X_a - X_b} \tag{3}$$

$$\beta = Y_b - \alpha \cdot X_b \tag{4}$$

Finally, the linear model parameters a and B are obtained according to the following equations.

Figure 4:
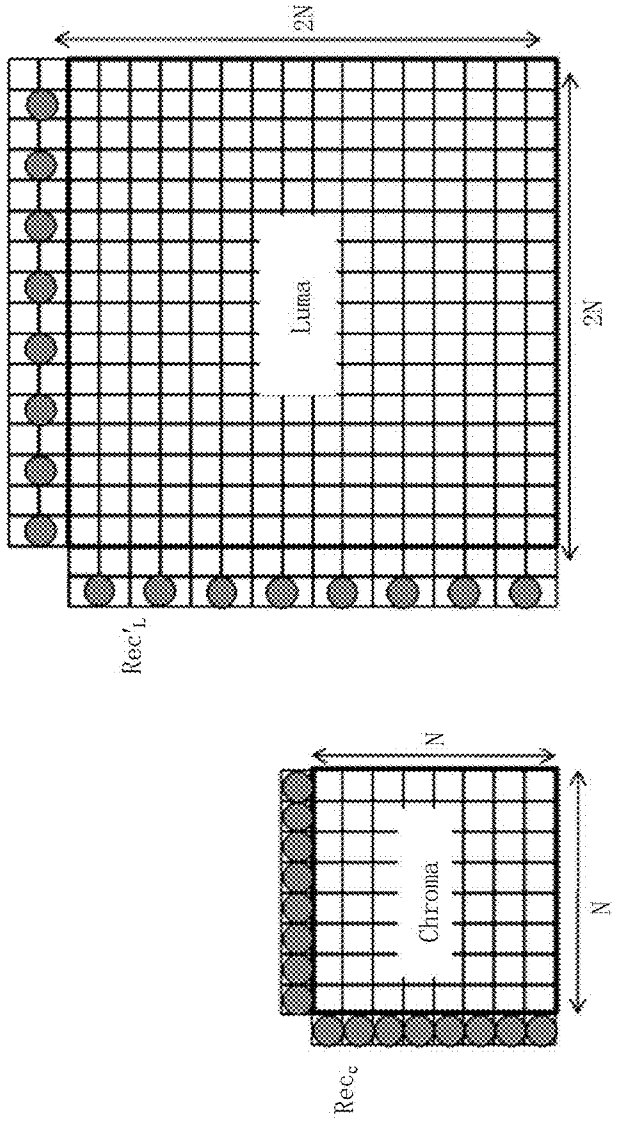
FIG. 4 illustrates an example of the locations of the left and above samples and the sample of the current block involved in the CCLM mode.

FIG. 4 illustrates an example of the locations of the left and above samples and the sample of the current block involved in the CCLM mode, including locations of left and above samples of an N×N chroma block in the CU and locations of left and above samples of an 2N×2N luma block in the CU.

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for I/diff is reduced into 16 elements for 16 values of the significand as follows:

$$DivTable\,[\,] = \{0, 7, 6, 5, 5, 4, 4, 3, 3, 2, 2, 1, 1, 1, 1, 0\} \tag{5}$$

This would have a benefit of both reducing the complexity of the calculation as well as the memory size required for storing the needed tables Besides the above template and left template can be used to calculate the linear model coefficients together, they also can be used alternatively in the other 2 LM modes, called LM_A, and LM_L modes.

In LM_T mode, only the above template is used to calculate the linear model coefficients. To get more samples, the above template is extended to (W+H) samples. In LM_L mode, only left template is used to calculate the linear model coefficients. To get more samples, the left template is extended to (H+W) samples.

In LM_LT mode, left and above templates are used to calculate the linear model coefficients.

To match the chroma sample locations for 4:2:0 video sequences, two types of down $$Rec'_L(i, j) = \left[\begin{matrix} rec_L(2i-1, 2j-1) + 2\cdot rec_L(2i, 2j-1) + rec_L(2i+1, 2j-1) + \\ rec_L(2i-1, 2j) + 2\cdot rec_L(2i, 2j) + rec_L(2i+1, 2j) + 4 \end{matrix}\right] \gg 3 \tag{6}$$

$$rec'_L(i, j) = \left[\begin{matrix} rec_L(2i, 2j-1) + rec_L(2i-1, 2j) + 4\cdot rec_L(2i, 2j) + \\ rec_L(2i+1, 2j) + rec_L(2i, 2j+1) + 4 \end{matrix}\right] \gg 3 \tag{7}$$

sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the a and B values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

Derivation of chroma prediction mode from luma mode when cclm is enabled

| Chroma | Corresponding luma intra prediction mode | | | | |
|---|---|---|---|---|---|
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2.

TABLE 2

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

During the ECM development, the simplified derivation of α and β (min-max approximation) is removed. Instead, linear least square solution between causal reconstructed data of down-sampled luma samples and causal chroma samples to derive model parameters α and β.

$$\alpha = \frac{I \times \sum_{i=0}^{I} Rec_C(i) \times Rec'_L(i) - \sum_{i=0}^{I} Rec_C(i) \times \sum_{i=0}^{I} Rec'_L(i)}{I \times \sum_{i=0}^{I} Rec'_L(i) \times Rec'_L(i) - \left(\sum_{i=0}^{I} Rec'_L(i)\right)^2} = \frac{A_1}{A_2} \tag{8}$$

$$\beta = \frac{\sum_{i=0}^{I} Rec_C(i) - \alpha \times \sum_{i=0}^{I} Rec'_L(i)}{I} \tag{9}$$

where $Rec_C(i)$ and $Rec'_L(i)$ indicate reconstructed chroma samples and down-sampled reconstructed luma samples around the target block, I indicates total samples number of neighboring data.

Figure 5A:
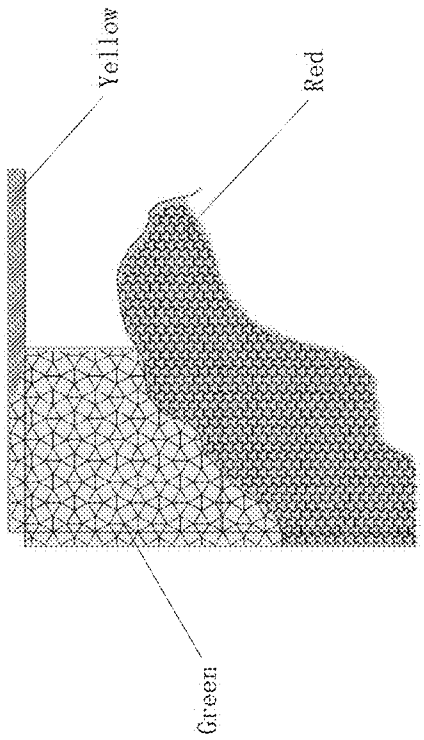
FIGS. 5A, 5B and 5C illustrate examples of deriving CCLM parameters.
Figure 5C:
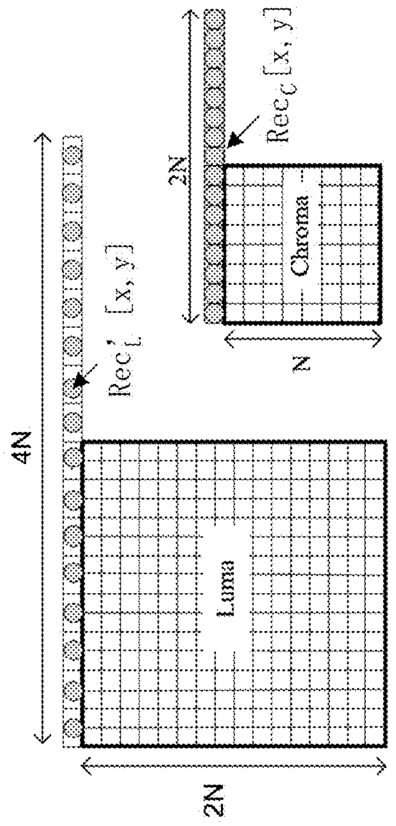
Figure 5B:
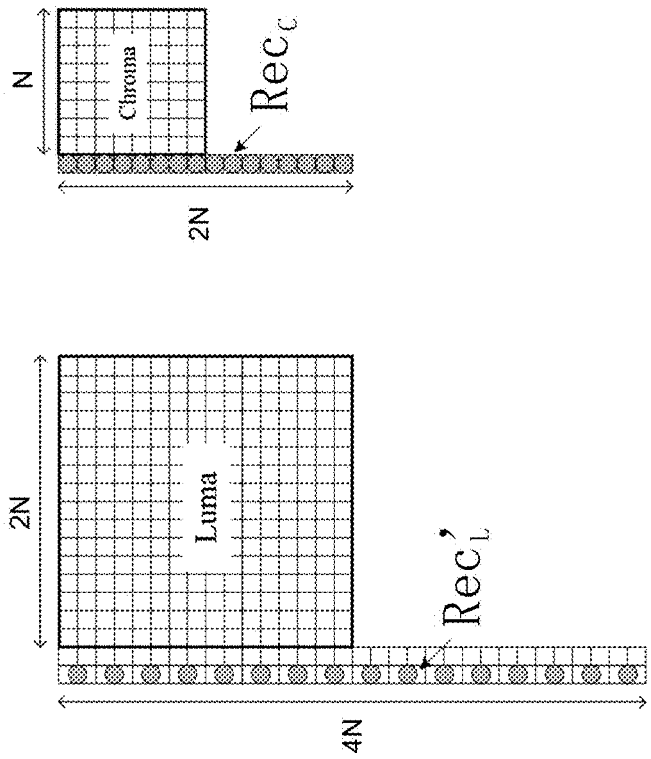

The LM_A, LM_L modes are also called Multi-Directional Linear Model (MDLM). FIG. 5A illustrates an example that MDLM works when the block content cannot be predicted from the L-shape reconstructed region. FIG. 5B illustrates MDLM_L which only uses left reconstructed samples to derive CCLM parameters. FIG. 5C illustrates MDLM_T which only uses top reconstructed samples to derive CCLM parameters.

Integerization for the above discussed Least Mean Square (LMS) (please refer to equations (8)-(9)) has been proposed as improvements for CCLM. The initial integerization design of LMS CCLM was firstly proposed in JCTVC-C206. The method was then improved by a series of simplification, including JCTVC-F0233/10178 which reduces α precision $n_\alpha$ from 13 to 7, JCTVC-I0151 which reduces the maximum multiplier bitwidth, and JCTVC-H0490/10166 which reduces division LUT entries from 64 to 32, finally leads to the ECM LMS version.

As discussed in equation (1), the integerization design utilizes the linear relationship to modelize the correlation of luma signal and chroma signal. The chroma values are predicted from reconstructed luma values of collocated block.

Luma and chroma components have different sampling ratios in YUV420 sampling. The sampling ratio of chroma components is half of that of luma component and has 0.5 pixel phase difference in vertical direction. Reconstructed luma needs down-sampling in vertical direction and sub-sample in horizontal direction to match size of chroma signal. For example, the down-sampling may be implemented by:

$$Rec'_L(i, j) = (rec_L(2i, 2j) + rec_L(2i, 2j+1)) \gg 1 \tag{10}$$

Float point operation is necessary in equation (8) to calculate linear model parameters α to keep high data accuracy. And float point multiplication is involved in equation (1) when α is represented by float point value. In this section, the integer implementation of this algorithm is designed. Specifically, fractional part of parameter a is quantized with $n_\alpha$ bits data accuracy. Parameter α value is represented by an up-scaled and rounded integer value α' and a'=a×(1<<$n_\alpha$). Then the linear model of equation (1) is changed to:

$$pred_C[x, y] = (\alpha' \cdot Rec'_L[x, y] \gg n_\alpha) + \beta' \tag{11}$$

Where β' is the rounding value of float point β and α'can be calculated as follows.

$$\alpha' = a \cdot (1 \ll n_\alpha) = \frac{A_1}{A_7} \cdot (1 \ll n_\alpha) \tag{12}$$

It is proposed to replace division operation of equation (12) by table lookup and multiplication. $A_2$ is firstly de-scaled to reduce the table size. $A_1$ is also de-scaled to avoid product overflow. Then, in $A_2$ it is kept only most significant bits defined by $n_{A_2}$ value and others bits are put to zero. The approximate value $A_2$'can be calculated as:

$$A'_2 = [A_2 \gg r_{A_2}] \cdot 2^{r_{A_2}} \tag{13}$$

Where [. . . ] means rounding operation and $r_{A_2}$ can be calculated as:

$$r_{A_2} = \max(bdepth(A_2) - n_{A_2}, 0)$$

Where bdepth($A_2$) means bit depth of value $A_2$.

Same operation is done for $A_1$, as follows:

$$A'_1 = [A_1 \gg r_{A_1}] \cdot 2^{r_{A_1}} \tag{14}$$

$$r_{A_1} = \max(bdepth(A_1) - n_{A_1}, 0)$$

Taking into account quantized representation of $A_1$ and $A_2$, equation (12) can be re-written as following.

$$\alpha' \approx \frac{[A_1 \gg r_{A_1}] \cdot 2^{r_{A_1}}}{[A_2 \gg r_{A_2}] \cdot 2^{r_{A_2}}} \cdot 2^{n_\alpha} = \frac{2^{n_{table}} \cdot [A_1 \gg r_{A_1}] \cdot 2^{r_{A_1} + n_\alpha}}{[A_2 \gg r_{A_2}] \cdot 2^{r_{A_2} + n_{table}}} \approx \left[\frac{2^{n_{table}}}{A_2 \gg r_{A_2}}\right] \cdot [A_1 \gg r_{A_1}] \cdot 2^{n_{A_1} + n_\alpha - (r_{A_2} + n_{table})} \tag{15}$$

Where $$\left[\frac{2^{n_{table}}}{A_2 \gg r_{A_2}}\right]$$

is represented as lookup table with length of $$2^{n_{A_2}}$$

to avoid the division.

In the simulation, the constant parameters are set as:

$n_\alpha$ equals to 13, which value is tradeoff between data accuracy and computational cost.

$n_{A_2}$ equals to 6, results in lookup table size as 64, table size can be further reduced to 32 by up-scaling $A_2$ when bdepth($A_2$)<6 (e.g. $A_2$<32).

$n_{table}$ equals to 15, results in 16 bits data representation of table elements.

$N_{A_1}$ is set as 15, to avoid product overflow and keep 16 bits multiplication.

In final, α' is clipped to [−2−15,215−1], to remain 16 bits multiplication in equation (11). With this clipping, the actual a value is limited to −4,4) when $n_\alpha$ equals to 13, which is useful to prevent the error amplification.

With calculated parameter α', parameter β' is calculated as follows:

$$\beta' = \frac{\sum_{i=0}^{I} Rec_C(i) - \left(\alpha' \cdot \left(\sum_{i=0}^{I} Rec'_L(i)\right) >> n_\alpha\right)}{I} \quad (16)$$

Wherein the division of above equation can be simply replaced by shift, since value/is power of 2.

Similar as discussed above with regard to equation (1), in HM6.0, an intra prediction mode called LM is applied to predict chroma PU based on a linear model using the reconstruction of the collocated luma PU. The parameters of the linear model consist of slope (a>>k) and y-intercept (b), which are derived from the neighboring luma and chroma pixels using the least mean square solution. The values of the prediction samples predSamples [x,y], with x,y=0 . . . nS−1, where nS specifies the block size of the current chroma PU, are derived as follows:

$$predSamples[x, y] = \text{Clip1}_C(((p_Y'[x, y] * a) >> k) + b), \quad (17)$$
$$\text{with } x, y = 0 \ldots nS-1$$

where $P_Y'$ [x,y] is the reconstructed pixels from the corresponding luma component. When the coordinates x and y are equal to or larger than 0, $P_Y'$ is the reconstructed pixel from the co-located luma PU. When x or y is less than 0, $P_Y'$ is the reconstructed neighboring pixel of the co-located luma PU.

Some intermediate variables in the derivation process, L, C, LL, LC, k2 and k3, are derived as:

$$L = \left(\sum_{y=0}^{nS-1} p_Y'[-1, y] + \sum_{x=0}^{nS-1} p_Y'[x, -1]\right) >> k3 \quad (18\text{-}1)$$

$$C = \left(\sum_{y=0}^{nS-1} p[-1, y] + \sum_{x=0}^{nS-1} p[x, -1]\right) >> k3 \quad (18\text{-}2)$$

$$LL = \left(\sum_{y=0}^{nS-1} p_Y'[-1, y]^2 + \sum_{x=0}^{nS-1} p_Y'[x, -1]^2\right) >> k3 \quad (18\text{-}3)$$

$$LC = \left(\sum_{y=0}^{nS-1} p_Y'[-1, y] * p[-1, y] + \sum_{y=0}^{nS-1} p_Y'[x, -1] * p[x, -1]\right) >> k3 \quad (18\text{-}4)$$

$$k2 = \text{Log2}((2 * nS) >> k3) \quad (18\text{-}5)$$

$$k3 = \text{Max}(0, BitDepth_C + \text{Log2}(nS) - 14) \quad (18\text{-}6)$$

Therefore, variables a, b and k can be derived as:

$$a1 = (LC << k2) - L * C \quad (19\text{-}1)$$

$$a2 = (LL << k2) - L * L \quad (19\text{-}2)$$

$$k1 = \text{Max}(0, \text{Log2}(\text{abs}(a2)) - 5) - \text{Max}(0, \text{Log2}(\text{abs}(a1)) - 14) + 2 \quad (19\text{-}3)$$

$$a1s = a1 >> \text{Max}(0, \text{Log2}(\text{abs}(a1)) - 14) \quad (19\text{-}4)$$

$$a2s = \text{abs}(a2 >> \text{Max}(0, \text{Log2}(\text{abs}(a2)) - 5)) \quad (19\text{-}5)$$

$$a3 = a2s < 1 ? 0 : \text{Clip3}(-2^{15}, 2^{15} - 1, a1s * lmDiv + (1 << (k1 - 1)) >> k1) \quad (19\text{-}6)$$

$$a = a3 >> \text{Max}(0, \text{Log2}(\text{abs}(a3)) - 6) \quad (19\text{-}7)$$

$$k = 13 - \text{Max}(0, \text{Log2}(\text{abs}(a)) - 6) \quad (19\text{-}8)$$

$$b = (L - ((a * C) >> k1) + (1 << (k2 - 1))) >> k2, \quad (19\text{-}9)$$

where lmDiv is specified in a 63-entry look-up table, i.e. Table 3, which is online generated by:

$$lmDiv(a2s) = ((1 << 15) + a2s/2)/a2s. \quad (20)$$

TABLE 3

Specification of lmDiv

| | | | | | | | | | | | | | |
|---|---|---|---|---|---|---|---|---|---|---|---|---|---|
| a2s | 1 | 2 | 3 | 4 | 5 | 6 | 7 | 8 | 9 | 10 | 11 | 12 | 13 |
| lmDiv | 32768 | 16384 | 10923 | 8192 | 6554 | 5461 | 4681 | 4096 | 3641 | 3277 | 2979 | 2731 | 2521 |
| a2s | 14 | 15 | 16 | 17 | 18 | 19 | 20 | 21 | 22 | 23 | 24 | 25 | 26 |
| lmDiv | 2341 | 2185 | 2048 | 1928 | 1820 | 1725 | 1638 | 1560 | 1489 | 1425 | 1365 | 1311 | 1260 |
| a2s | 27 | 28 | 29 | 30 | 31 | 32 | 33 | 34 | 35 | 36 | 37 | 38 | 39 |
| lmDiv | 1214 | 1170 | 1130 | 1092 | 1057 | 1024 | 993 | 964 | 936 | 910 | 886 | 862 | 840 |
| a2s | 40 | 41 | 42 | 43 | 44 | 45 | 46 | 47 | 48 | 49 | 50 | 51 | 52 |
| lmDiv | 819 | 799 | 780 | 762 | 745 | 728 | 712 | 697 | 683 | 669 | 655 | 643 | 630 |
| a2s | 53 | 54 | 55 | 56 | 57 | 58 | 59 | 60 | 61 | 62 | 63 | 64 | |
| lmDiv | 618 | 607 | 596 | 585 | 575 | 565 | 555 | 546 | 537 | 529 | 520 | 512 | |

In Equation (19-6), a1s is a 16-bit signed integer and ImDiv is a 16-bit unsigned integer. Therefore, 16-bit multiplier and 16-bit storage are needed. It is proposed to reduce the bit depth of multipliers to the internal bit depth, as well as the size of the look-up table, as detailed below.

The bit depth of a1s is reduced to the internal bit depth by changing equation (19-4) as:

$$a1s = a1 >> \text{Max}(0, \text{Log2}(\text{abs}(a1)) - (BitDepth_C - 2)). \quad (21)$$

The values of lmDiv with the internal bit depth are achieved with the following equation (22) and stored in the look-up table:

$$lmDiv(a2s) = \big((1 << (BitDepth_C - 1)) + a2s/2\big)/a2s. \quad (22)$$

Table 4 shows the example of internal bit depth 10.

TABLE 4

| Specification of lmDiv with the internal bit depth equal to 10 | | | | | | | | | | | | | | | | |
|---|---|---|---|---|---|---|---|---|---|---|---|---|---|---|---|---|
| a2s | 1 | 2 | 3 | 4 | 5 | 6 | 7 | 8 | 9 | 10 | 11 | 12 | 13 | 14 | 15 | 16 |
| lmDiv | 512 | 256 | 171 | 128 | 102 | 85 | 73 | 64 | 57 | 51 | 47 | 43 | 39 | 37 | 34 | 32 |
| a2s | 17 | 18 | 19 | 20 | 21 | 22 | 23 | 24 | 25 | 26 | 27 | 28 | 29 | 30 | 31 | 32 |
| lmDiv | 30 | 28 | 27 | 26 | 24 | 23 | 22 | 21 | 20 | 20 | 19 | 18 | 18 | 17 | 17 | 16 |
| a2s | 33 | 34 | 35 | 36 | 37 | 38 | 39 | 40 | 41 | 42 | 43 | 44 | 45 | 46 | 47 | 48 |
| lmDiv | 16 | 15 | 15 | 14 | 14 | 13 | 13 | 13 | 12 | 12 | 12 | 12 | 11 | 11 | 11 | 11 |
| a2s | 49 | 50 | 51 | 52 | 53 | 54 | 55 | 56 | 57 | 58 | 59 | 60 | 61 | 62 | 63 | |
| lmDiv | 10 | 10 | 10 | 10 | 10 | 9 | 9 | 9 | 9 | 9 | 9 | 9 | 8 | 8 | 8 | |

Modifications are also made to Equation (19-3) and (19-8) as below:

$$k1 = \text{Max}(0, \text{Log2}(\text{abs}(a2)) - 5) - \text{Max}(0, \text{Log2}(\text{abs}(a1)) - (BitDepth_C - 2)), \text{ and} \quad (23\text{-}1)$$

$$k = BitDepth_C - 1 - \text{Max}(0, \text{Log2}(\text{abs}(a)) - 6). \quad (23\text{-}2)$$

It is also proposed to reduce the entries from 63 to 32, and the bits for each entry from 16 to 10, as shown in Table 5. By doing this, almost 70% memory saving can be achieved. The corresponding changes for equation (19-6), equation (20) and equation (19-8) are as follows:

$$a3 = a2s < 32 ? 0 : \text{Clip3}\big(-2^{15}, 2^{15} - 1, a1s * lmDiv + (1 << (k1 - 1)) >> k1\big) \quad (24\text{-}1)$$

$$lmDiv(a2s) = \big((1 << (BitDepth_C + 4)) + a2s/2\big)/a2s \quad (24\text{-}2)$$

$$k = BitDepth_C + 4 - \text{Max}(0, \text{Log2}(\text{abs}(a)) - 6). \quad (24\text{-}3)$$

TABLE 5

| Specification of lmDiv with the internal bit depth equal to 10 | | | | | | | | | | | | | | | | |
|---|---|---|---|---|---|---|---|---|---|---|---|---|---|---|---|---|
| a2s | 32 | 33 | 34 | 35 | 36 | 37 | 38 | 39 | 40 | 41 | 42 | 43 | 44 | 45 | 46 | 47 |
| lmDiv | 512 | 496 | 482 | 468 | 455 | 443 | 431 | 420 | 410 | 400 | 390 | 381 | 372 | 364 | 356 | 349 |
| a2s | 48 | 49 | 50 | 51 | 52 | 53 | 54 | 55 | 56 | 57 | 58 | 59 | 60 | 61 | 62 | 63 |
| lmDiv | 341 | 334 | 328 | 321 | 315 | 309 | 303 | 298 | 293 | 287 | 282 | 278 | 273 | 269 | 264 | 260 |

Multi-Model Linear Model Prediction

Figure 6:
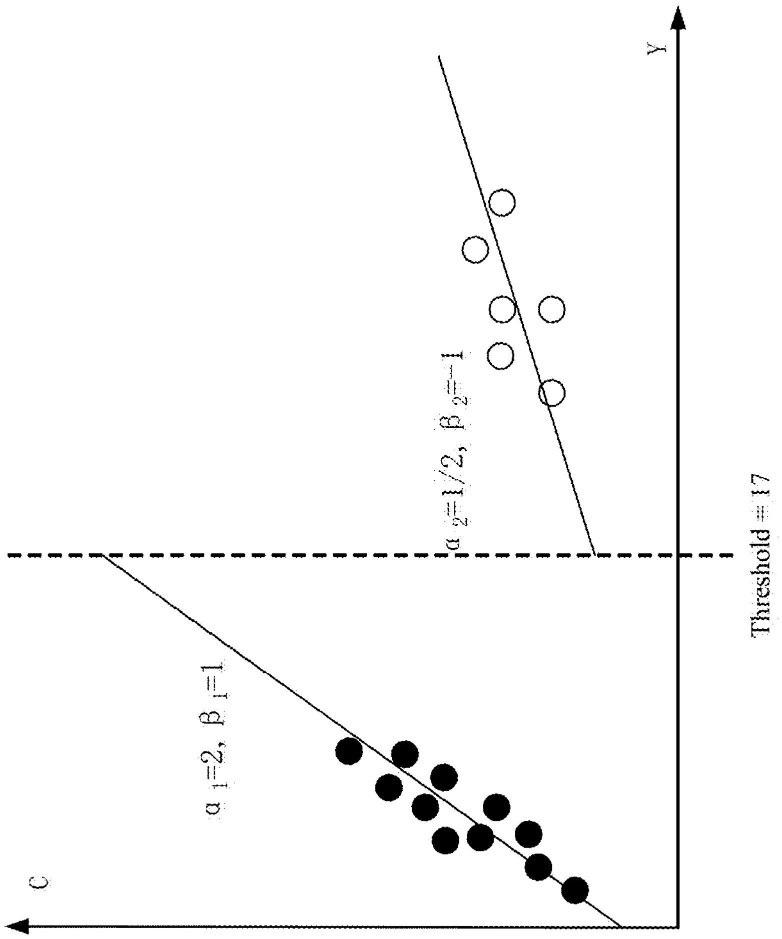
FIG. 6 illustrates an example of classifying the neighboring samples into two groups based on the value Threshold.

In ECM-1.0, Multi-model LM (MMLM) prediction mode is proposed, for which the chroma samples are predicted based on the reconstructed luma samples of the same CU by using two linear models as follows:

$$\begin{cases} pred_C(i,j) = \alpha_1 \cdot rec'_L(i,j) + \beta_1 & \text{if } rec'_L(i,j) \le \text{Threshold} \\ pred_C(i,j) = \alpha_2 \cdot rec'_L(i,j) + \beta_2 & \text{if } rec'_L(i,j) > \text{Threshold} \end{cases} \quad (25)$$

where $pred_C(i, j)$ represents the predicted chroma samples in a CU and $rec_L'(i, j)$ represents the down-sampled reconstructed luma samples of the same CU. Threshold is calculated as the average value of the neighboring reconstructed luma samples. FIG. 6 illustrates an example of classifying the neighboring samples into two groups based on the value Threshold. For each group, parameter $\alpha_i$ and $\beta_i$, with i equal to 1 and 2 respectively, are derived from the straight-line relationship between luma values and chroma values from two samples, which are minimum luma sample A ($X_A$, $Y_A$) and maximum luma sample B ($X_B$, $Y_B$) inside the group. Here $X_A$, $Y_A$ are the x-coordinate (i.e., luma value) and y-coordinate (i.e., chroma value) value for sample A, and $X_B$, $Y_B$ are the x-coordinate and y-coordinate value for sample B. The linear model parameters α and β are obtained according to the following equations.

$$\alpha = \frac{y_B - y_A}{x_b - x_A} \quad (26)$$

$$\beta = y_A - \alpha x_A$$

Such a method is also called min-max method. The division in the equation above could be avoided and replaced by a multiplication and a shift.

For a coding block with a square shape, the above two equations are applied directly. For a non-square coding block, the neighboring samples of the longer boundary are first subsampled to have the same number of samples as for the shorter boundary.

Besides the scenario wherein the above template and the left template are used together to calculate the linear model coefficients, the two templates also can be used alternatively in the other two MMLM modes, called MMLM_A, and MMLM_L modes.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, a total of 11 intra modes are allowed for chroma intra mode coding. Those modes include five traditional intra modes and six cross-component linear model modes (CCLM, LM_A, LM_L, MMLM, MMLM_A and MMLM_L). Chroma mode signaling and derivation process are shown in Table 6. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 6

Derivation of chroma prediction mode from luma mode when MMLM is enabled

| Chroma | Corresponding luma intra prediction mode | | | | |
|---|---|---|---|---|---|
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 84 | 84 | 84 | 84 | 84 |
| 8 | 85 | 85 | 85 | 85 | 85 |
| 9 | 86 | 86 | 86 | 86 | 86 |
| 10 | 0 | 50 | 18 | 1 | X |

Figure 7:
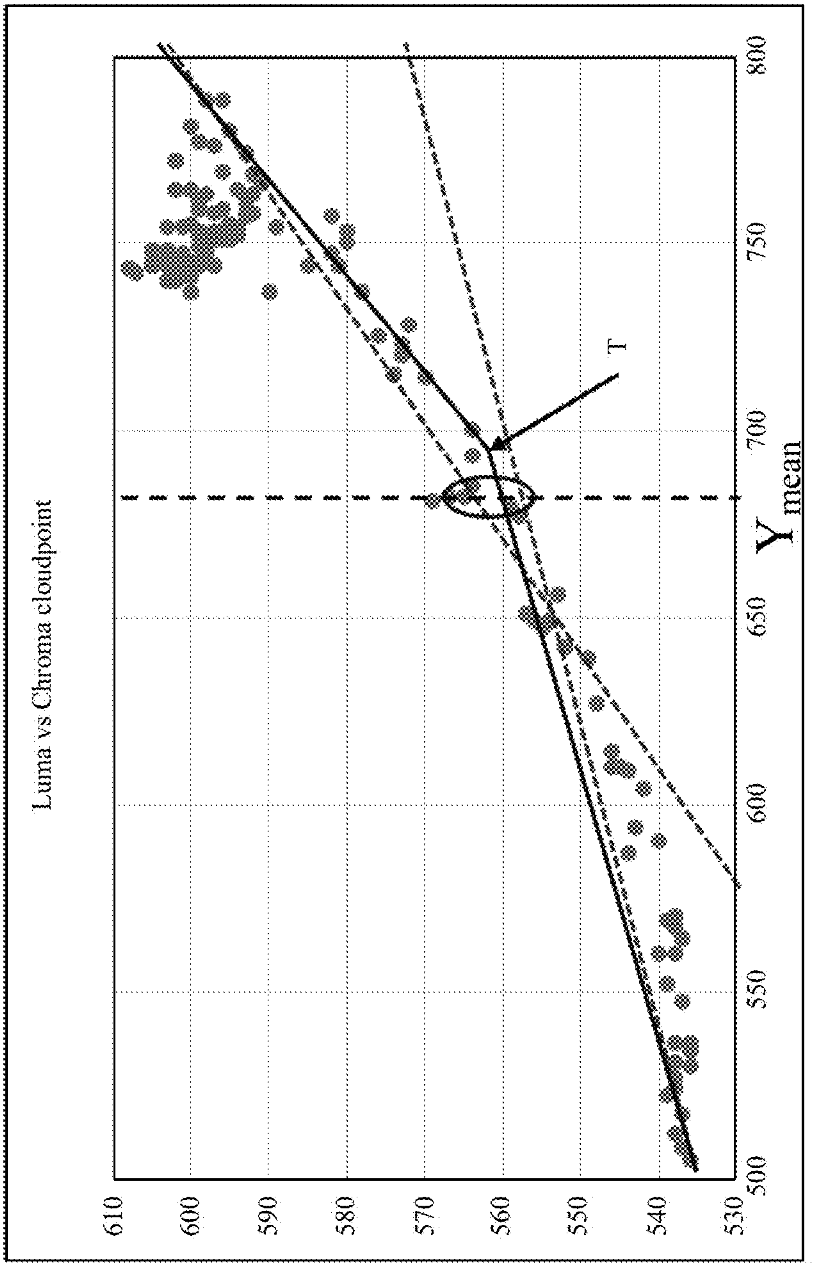
FIG. 7 illustrates an example of classifying the neighboring samples into two groups based on a knee point.

MMLM and LM modes may also be used together in an adaptive manner. For MMLM, two linear models are as follows:

$$\begin{cases} pred_C(i,j) = \alpha_1 \cdot rec'_L(i,j) + \beta_1 & \text{if } rec'_L(i,j) \le \text{Threshold} \\ pred_C(i,j) = \alpha_2 \cdot rec'_L(i,j) + \beta_2 & \text{if } rec'_L(i,j) > \text{Threshold} \end{cases} \quad (27)$$

where $pred_C(i, j)$ represents the predicted chroma samples in a CU and $rec_L'$ (i, j) represents the downsampled reconstructed luma samples of the same CU. Threshold can be simply determined based on the luma and chroma average values together with their minimum and maximum values. FIG. 7 shows an example of classifying the neighboring samples into two groups based on the knee point, T, indicated by an arrow. Linear model parameter $\alpha_1$ and $\beta_1$ are derived from the straight-line relationship between luma values and chroma values from two samples, which are minimum luma sample A ($X_A$, $Y_A$) and the Threshold ($X_T$, $Y_T$). Linear model parameter $\alpha_2$ and $\beta_2$ are derived from the straight-line relationship between luma values and chroma values from two samples, which are maximum luma sample B ($X_B$, $Y_B$) and the Threshold ($X_T$, $Y_T$). Here $X_A$, $Y_A$ are the x-coordinate (i.e., luma value) and y-coordinate (i.e., chroma value) value for sample A, and $X_B$, $Y_B$ are the x-coordinate and y-coordinate value for sample B. The linear model parameters $\alpha_i$ and $\beta_i$ for each group, with i equal to 1 and 2 respectively, are obtained according to the following equations.

$$\alpha_1 = \frac{Y_T - Y_A}{X_T - X_A} \quad (28)$$

$$\beta_1 = Y_A - \alpha_1 X_A$$

$$\alpha_2 = \frac{Y_B - Y_T}{X_B - X_T}$$

$$\beta_2 = Y_T - \alpha_2 X_T$$

For a coding block with a square shape, the above equations are applied directly. For a non-square coding block, the neighboring samples of the longer boundary are first subsampled to have the same number of samples as for the shorter boundary.

Besides the scenario wherein the above template and the left template are used together to determine the linear model coefficients, the two templates also can be used alternatively in the other two MMLM modes, called MMLM_A, and MMLM_L modes respectively.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, there is a condition check used to select LM modes (CCLM, LM_A, and LM_L) or multi-model LM modes (MMLM, MMLM_A, and MMLM_L). The condition check is as follows:

$$\begin{cases} LM \text{ modes} & \text{if } (((Y_T - Y_A) \le d \| (Y_B - Y_T) \le d \,\&(\text{block area} \ge BlkSizeThres_{LM})) \\ MMLM \text{ modes} & \text{if } (((Y_T - Y_A) > d \,\&\,\&(Y_B - Y_T) > d) \,\&(\text{block area} \ge BloSizeThres_{MM})) \end{cases} \quad (29)$$

where $\text{BlkSizeThres}_{LM}$ represents the smallest block size of LM modes and $\text{BlkSizeThres}_{MM}$ represents the smallest block size of MMLM modes. The symbol d represents a pre-determined threshold value. In one example, d may take a value of 0. In another example, d may take a value of 8.

For chroma intra mode coding, a total of 8 intra modes are allowed for chroma intra mode coding. Those modes include five traditional intra modes and three cross-component linear model modes. Chroma mode signaling and derivation process are shown in Table 1. It is worth noting that for a given CU, if it is coded under linear model mode, whether it is a conventional single model LM mode or a MMLM mode is determined based on the condition check above. Unlike the case shown in Table 6, there are no separate MMLM modes to be signaled. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

During ECM development, scale (slope) adjustment for CCLM are proposed as further improvements, for example, as described in JVET-Y0055/20049.

As discussed above, CCLM uses a model with 2 parameters to map luma values to chroma values. The scale parameter "a" and the bias parameter "b" define the mapping as follows:

$$chromaVal = a * lumVal + b \quad (30)$$

It is proposed to signal an adjustment "u" to the scale parameter to update the model to the following form:

$$chromaVal = a' * + lumaVal + b' \quad (31)$$

where a'=a+u, and b'=b−u*$y_r$.

Figure 8A:
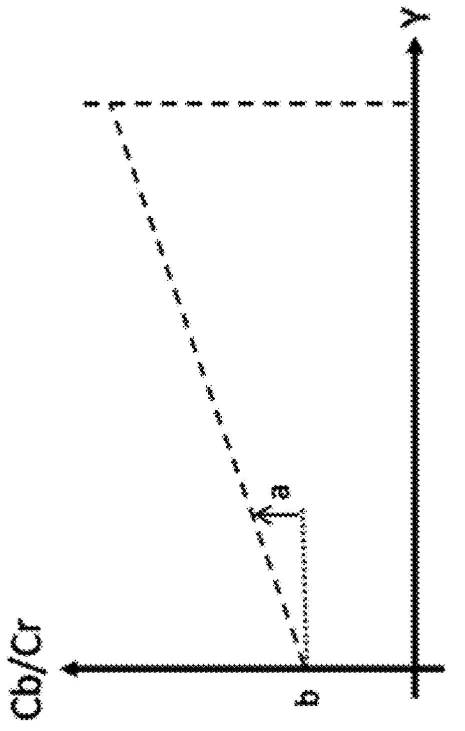
FIGS. 8A and 8B illustrate the effect of the scale adjustment parameter "u".
Figure 8B:
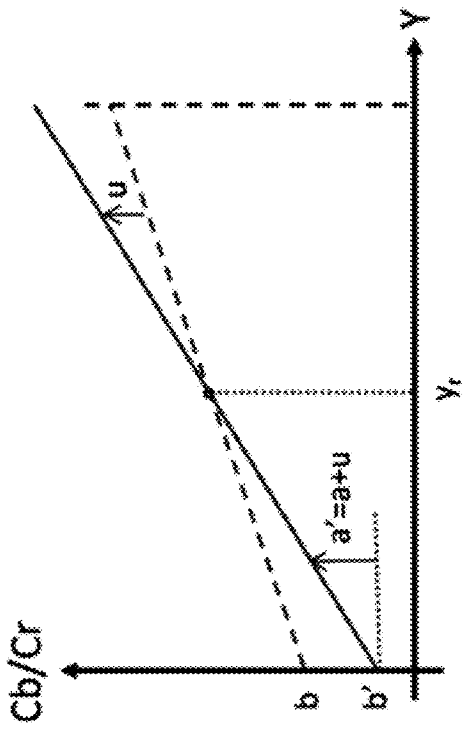

With this selection, the mapping function is tilted or rotated around the point with luminance value $y_r$. It is proposed to use the average of the reference luma samples used in the model creation as $y_r$ in order to provide a meaningful modification to the model. FIGS. 8A to 8B illustrate the effect of the scale adjustment parameter "u", wherein FIG. 8A illustrates the model created without the scale adjustment parameter "u", and FIG. 8B illustrates the model created with the scale adjustment parameter "u".

In one example, the scale adjustment parameter is provided as an integer between −4 and 4, inclusive, and signaled in the bitstream. The unit of the scale adjustment parameter is ⅛th of a chroma sample value per one luma sample value (for 10-bit content).

In one example, adjustment is available for the CCLM models that are using reference samples both above and left of the block ("LM_CHROMA_IDX" and "MMLM_CHROMA_IDX"), but not for the "single side" modes. This selection is based on coding efficiency vs. complexity trade-off considerations.

When scale adjustment is applied for a multimode CCLM model, both models can be adjusted and thus up to two scale updates are signaled for a single chroma block.

To enable the scale adjustment at the encoder, the encoder may perform an SATD based search for the best value of the scale update for Cr and a similar SATD based search for Cb. If either one results as a non-zero scale adjustment parameter, the combined scale adjustment pair (SATD based update for Cr. SATD based update for Cb) is included in the list of RD checks for the TU.

The Fusion of Chroma Intra Prediction Modes

During ECM development, JVET-Y0092/20051 proposed fusion of chroma intra modes.

The intra prediction modes enabled for the chroma components in ECM-4.0 are six cross-component linear model (LM) modes including CCLM_LT, CCLM_L, CCLM_T, MMLM_LT, MMLM_L and MMLM_T modes, the direct mode (DM), and four default chroma intra prediction modes. The four default modes are given by the list {0, 50, 18, 1} and if the DM mode already belongs to that list, the mode in the list will be replaced with mode 66.

A decoder-side intra mode derivation (DIMD) method for luma intra prediction is included in ECM-4.0. First, a horizontal gradient and a vertical gradient are calculated for each reconstructed luma sample of the L-shaped template of the second neighboring row and column of the current block to build a Histogram of Gradients (HoG). Then, the two intra prediction modes with the largest and the second largest histogram amplitude values are blended with the Planar mode to generate the final predictor of the current luma block.

In order to improve the coding efficiency of chroma intra prediction, two methods are proposed, including a decoder-side derived chroma intra prediction mode (DIMD chroma) and a fusion of a non-LM mode and the MMLM_LT mode.

Figure 8C:
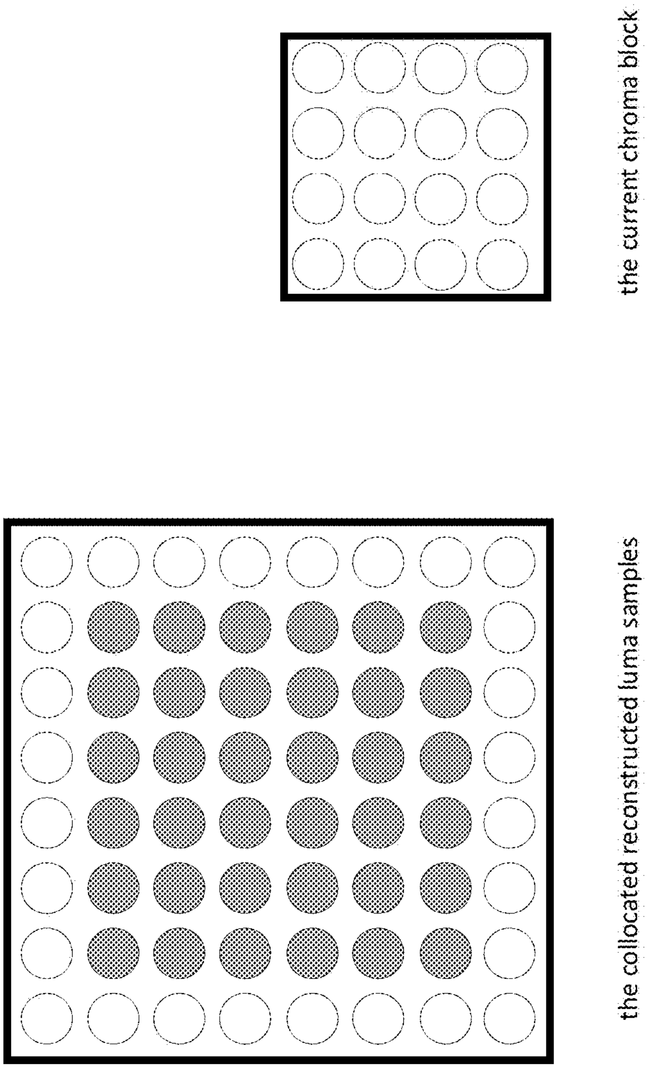
FIG. 8C illustrates the collocated reconstructed luma samples.

In a first embodiment, a DIMD chroma mode is proposed. The proposed DIMD chroma mode uses the DIMD derivation method to derive the chroma intra prediction mode of the current block based on the collocated reconstructed luma samples. Specifically, a horizontal gradient and a vertical gradient are calculated for each collocated reconstructed luma sample of the current chroma block to build a HoG, as shown in FIG. 8C. Then the intra prediction mode with the largest histogram amplitude values is used for performing chroma intra prediction of the current chroma block.

When the intra prediction mode derived from the DIMD chroma mode is the same as the intra prediction mode derived from the DM mode, the intra prediction mode with the second largest histogram amplitude value is used as the DIMD chroma mode.

A CU level flag is signaled to indicate whether the proposed DIMD chroma mode is applied as shown in Table 7.

TABLE 7

The binarization process for intra_chroma_pred_mode in the proposed method

| intra_chroma_pred_mode | bin string | chroma intra mode |
|---|---|---|
| 0 | 1100 | list[0] |
| 1 | 1101 | list[1] |
| 2 | 1110 | list[2] |
| 3 | 1111 | list[3] |
| 4 | 10 | DIMD chroma |
| 5 | 0 | DM |

In a second embodiment, a fusion of chroma intra prediction modes is proposed, wherein the DM mode and the four default modes can be fused with the MMLM_LT mode as follows:

$$pred = (w0 * pred0 + w1 * pred1 + (1 \ll (\text{shift} - 1))) \gg \text{shift}$$

where pred0 is the predictor obtained by applying the non-LM mode, pred1 is the predictor obtained by applying the MMLM_LT mode and pred is the final predictor of the current chroma block. The two weights, w0 and w1 are determined by the intra prediction mode of adjacent chroma blocks and shift is set equal to 2. Specifically, when the above and left adjacent blocks are both coded with LM modes, {w0, w1}={1, 3}; when the above and left adjacent blocks are both coded with non-LM modes, {w0, w1}={3, 1}; otherwise, {w0, w1}={2, 2}.

For the syntax design, if a non-LM mode is selected, one flag is signaled to indicate whether the fusion is applied. And the proposed fusion is only applied to I slices.

In a third embodiment, the DIMD chroma mode and the fusion of chroma intra prediction modes are combined. Specifically, the DIMD chroma mode described in the first embodiment is applied, and for I slices, the DM mode, the four default modes and the DIMD chroma mode can be fused with the MMLM_LT mode using the weights described in the second embodiment, while for non-I slices, only the DIMD chroma mode can be fused with the MMLM_LT mode using equal weights.

Figure 8D:
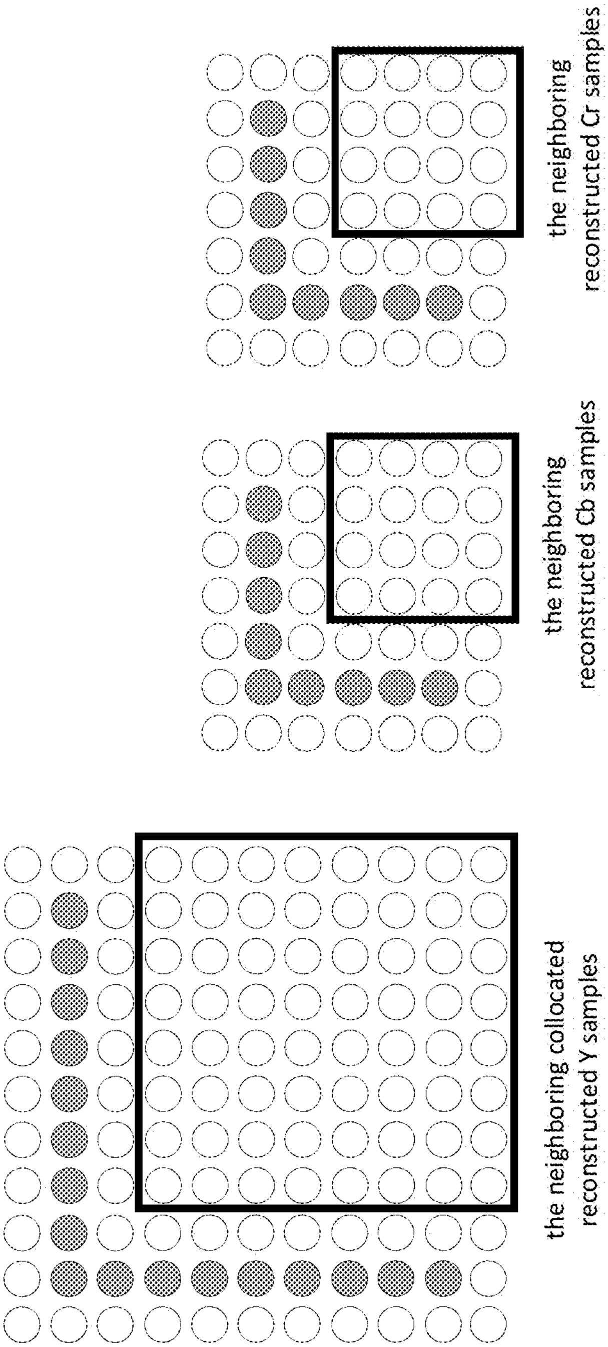
FIG. 8D illustrates the neighboring reconstructed samples.

In a fourth embodiment, the DIMD chroma mode with reduced processing and the fusion of chroma intra prediction modes are combined. Specifically, the DIMD chroma mode with reduced processing derives the intra mode based on the neighboring reconstructed Y, Cb and Cr samples in the second neighboring row and column as shown in FIG. 8D. Other parts are the same as the third embodiment.

In one embodiment, when DIMD is applied, two intra modes are derived from the reconstructed neighbor samples, and those two predictors are combined with the planar mode predictor with the weights derived from the gradients as described in JVET-00449. The division operations in weight derivation is performed utilizing the same lookup table (LUT) based integerization scheme used by the CCLM. For example, the division operation in the orientation calculation $$\text{Orient} = G_y / G_x$$

is computed by the following LUT-based scheme:

$$x = Floor(\text{Log2}(Gx))$$

$$normDiff = ((Gx \ll 4) \gg x)\ \&\ 15$$

$$x \mathrel{+}= (3 + (normDiff\ != 0)\ ?\ 1 : 0)$$

$$\text{Orient} = (Gy * (DivSigTable[normDiff] \mid 8 + (1 \ll (x-1))) \gg x$$

where

DivSigTable [16]={0, 7, 6, 5,5, 4, 4, 3, 3, 2, 2, 1, 1, 1, 1, 0}.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Figure 8E:
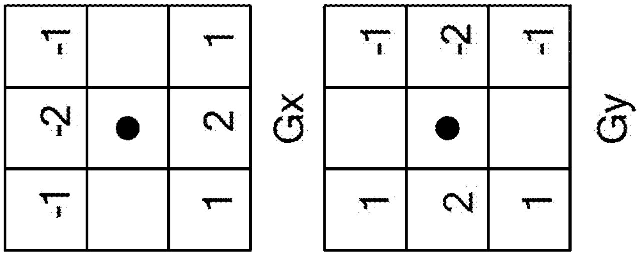
FIGS. 8E, 8F, 8G and 8H illustrate the steps of decoder-side intra mode derivation.
Figure 8E:
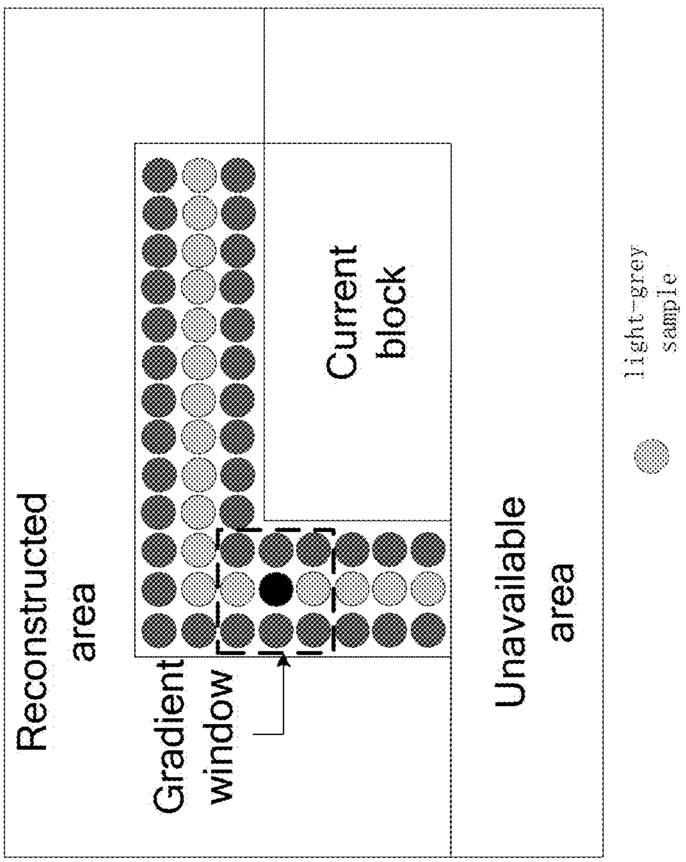
Figure 8F:
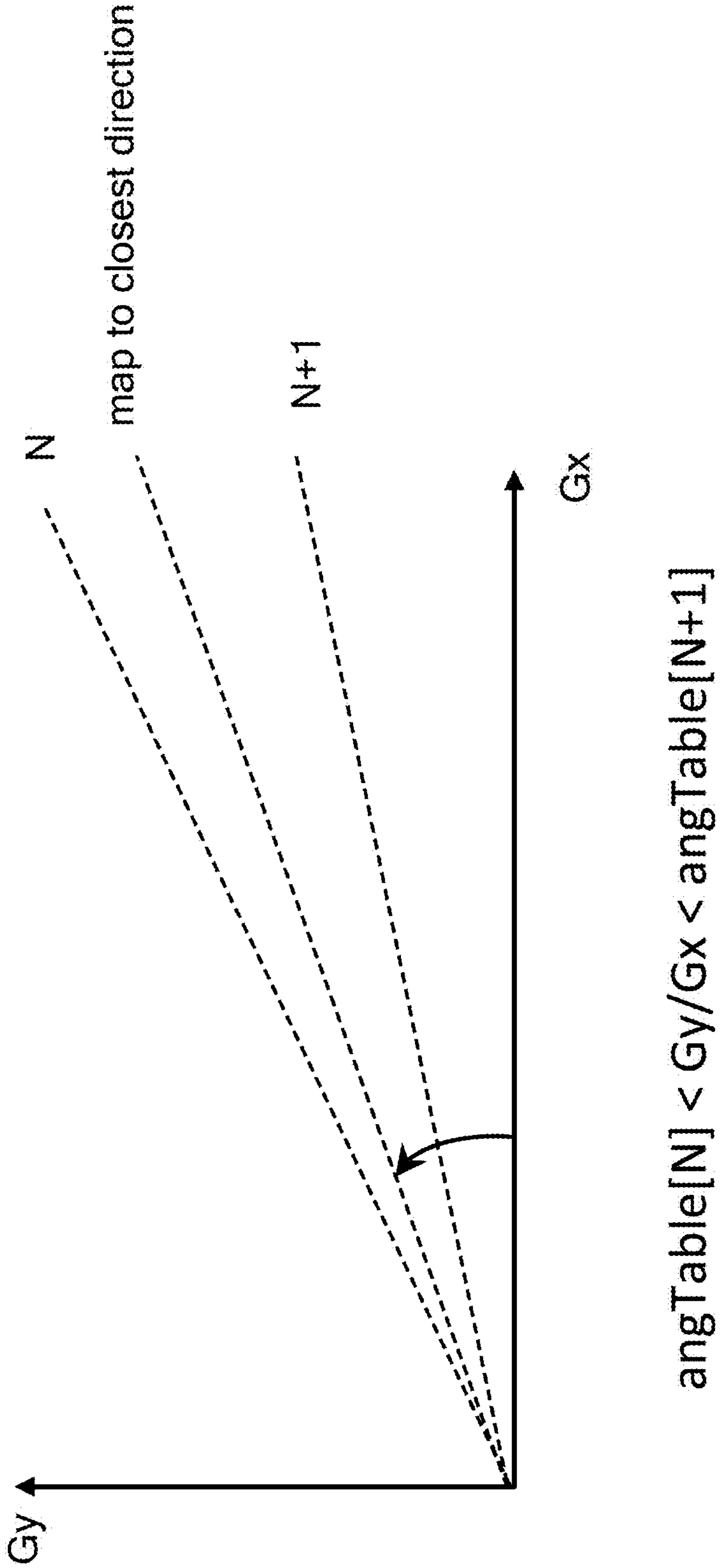
Figure 8G:
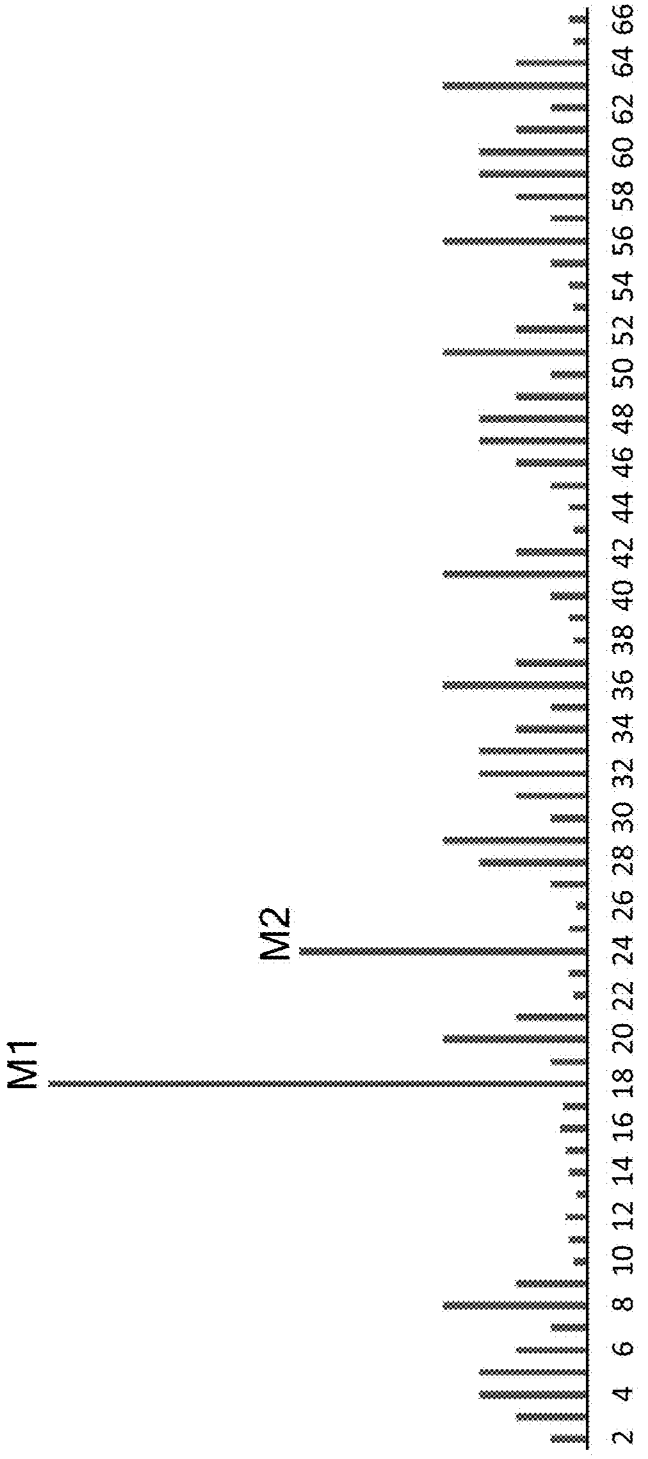
Figure 8H:
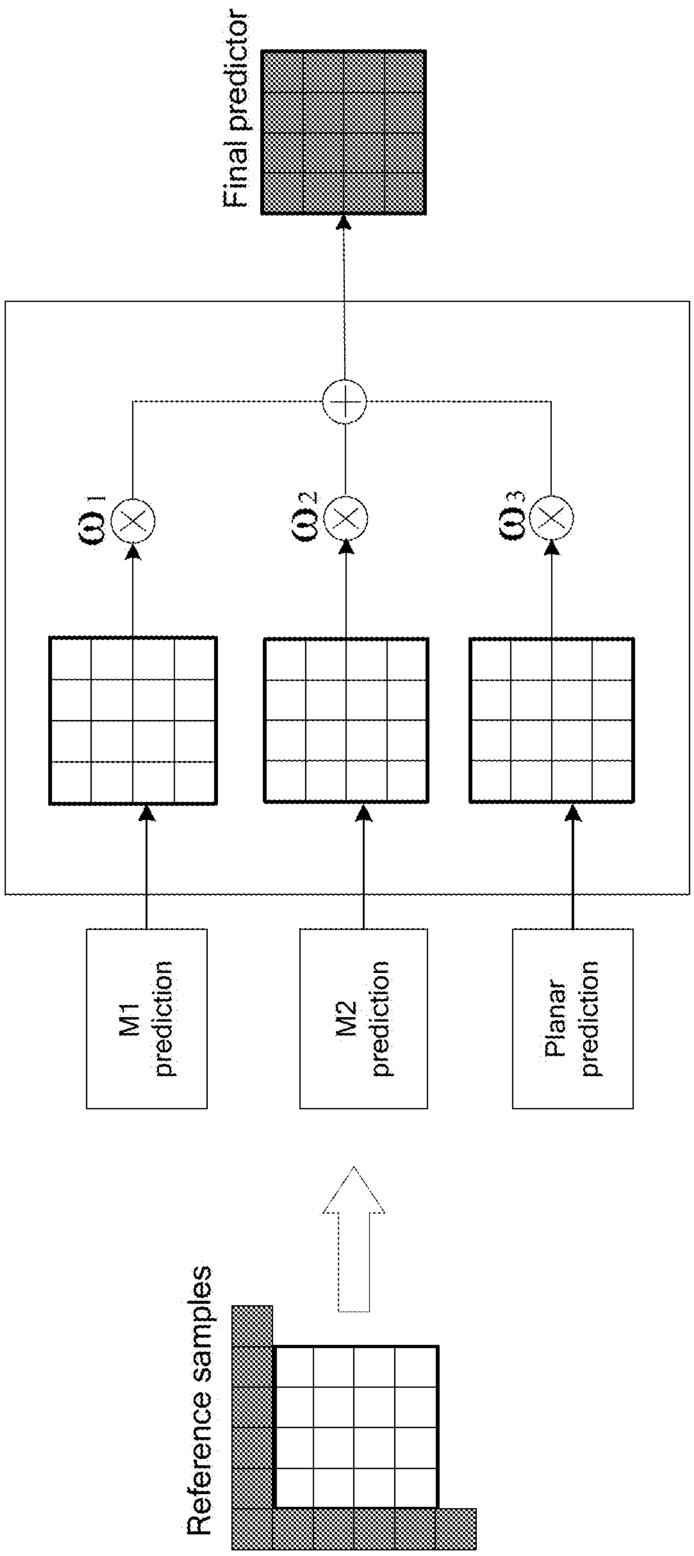

FIGS. 8E to 8H illustrate the steps of decoder-side intra mode derivation, wherein intra prediction direction is estimated without intra mode signaling. The first step as shown in FIG. 8E includes estimating gradient per sample (for light-grey samples as illustrated in FIG. 8E). The second step as shown in FIG. 8F includes mapping gradient values to closest prediction direction within [2,66]. The third step as shown in FIG. 8G includes selecting 2 prediction directions, wherein for each prediction direction, all absolute gradients Gx and Gy of neighboring pixels with that direction are summed up, and top 2 directions are selected. The fourth step as shown in FIG. 8H includes enabling weighted intra prediction with the selected directions.

Figure 9:
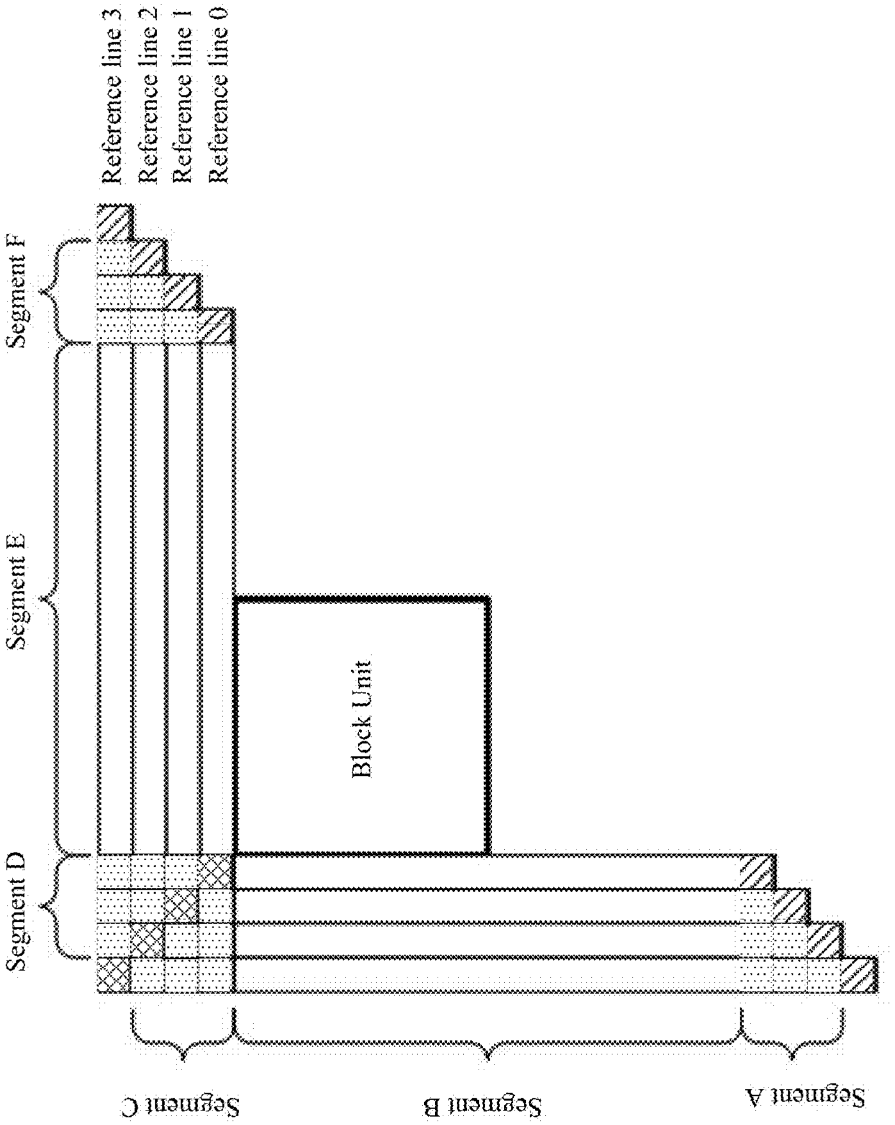
FIG. 9 illustrates an example of four reference lines neighboring to a prediction block.

Multiple reference line (MRL) intra prediction uses more reference lines for intra prediction. In FIG. 9, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL. 2 additional lines (reference line 1 and reference line 3) are used.

The index of selected reference line (mrl_idx) is signaled and used to generate intra predictor. For reference line idx, which is greater than 0, only include additional reference line modes in MPM list and only signal mpm index without remaining mode. The reference line index is signaled before intra prediction modes, and Planar mode is excluded from intra prediction modes in case a nonzero reference line index is signaled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its down-sampling filters. The definition of MRL to use the same 3 lines is aligned as CCLM to reduce the storage requirements for decoders.

In the existing CCLM or MMLM design, the neighboring reconstructed luma-chroma sample pairs are classified into one or more sample groups based on the value Threshold, which only considers the luma DC values. That is, a luma-chroma sample pair is classified by only considering the intensity of the luma sample. However, luma component usually preserves abundant textures, and the current luma sample may be highly correlated with neighboring luma samples, such inter-sample correlation (AC correlation) may benefit the classification of luma-chroma sample pairs and can bring additional coding efficiency.

Edge-Classified Linear Model (ELM)

To improve the coding efficiency of luma and chroma components, classifiers considering luma edge or AC information is introduced, in contrast to the above implementations wherein only luma DC values are considered. Besides the existing band-classified MMLM, the present disclosure provides exemplary classifiers. The process of generating linear prediction models for different sample groups may be similar as CCLM or MMLM (e.g., via a least square method, or a simplified min-max method, etc.), but with different metrices for classification. Different classifiers may be used to classify the neighboring luma samples (e.g., of the neighboring luma-chroma sample pairs) and/or the luma samples corresponding to chroma samples to be predicted. The luma samples corresponding to the chroma samples may be obtained by a down-sampling operation to match the locations of the corresponding chroma samples for 4:2:0 video sequences. For example, a luma sample corresponding to a chroma sample may be obtained by performing a down-sampling operation on more than one (e.g., 4) reconstructed luma samples corresponding to the chroma sample (e.g., located around the chroma sample). Alternatively, the luma samples may obtained directly from the reconstructed luma samples in a case of 4:4:4 video sequences, for example. Alternatively, the luma samples may be obtained from respective ones of the reconstructed luma samples that are at respective collocated positions for the corresponding chroma samples. For example, a luma sample to be classified may be obtained from one of four reconstructed luma samples corresponding to the chroma sample that is at a left-top position of the four reconstructed luma samples, which may be considered as a collocated position for the chroma sample.

A first classifier may classify luma samples according to their edge strengths. For example, one direction (e.g., 0-degree, 45-degree, or 90-degree, etc.) may be selected to calculate the edge strength. A direction may be formed by a current sample and a neighboring sample along the direction (e.g., a neighboring sample located at the right-top of the current sample for 45-degree). An edge strength may be calculated by subtracting the neighbor sample from the current sample. The edge strength may be quantized into one of M segments by M−1 thresholds, and the first classifier may usc M classes to classify the current sample. Alternatively or additionally, N directions may be formed by a current sample and N neighboring samples along the N directions. N edge strengths may be calculated by subtracting N neighboring samples from the current sample, respectively. Similarly, if each of the N edge strengths may be quantized into one of M segments by M−1 thresholds, then the first classifier may use MN classes to classify the current sample.

A second classifier may be used to classify according to a local pattern. For example, a current luma sample Y0 may be compared with its neighboring N luma samples Yi. A score may be added by one if the value of Y0 is greater than that of Yi, otherwise, the score may be reduced by one. The sore may be quantized to form K classes. The second classifier may classify a current sample into one of the K classes. For example, the neighboring luma samples may be obtained from four neighbors that are located above, left, right and below the current luma samples, i.e., without diagonal neighbors.

It may be contemplated that a plurality of the first classifier, the second classifier, or different instances of the first or second classifier or other classifiers described herein may be combined. For example, a first classifier may be combined with the existing MMLM threshold-based classifier. For another example, instance A of the first classifier may be combined with another instance B of the first classifier, where the instance A and B employ different directions (e.g., employing vertical and horizontal directions, respectively).

It will be appreciated by those skilled in the art that though the existing CCLM design in the VVC standard is used as the basic CCLM method in the description, the proposed cross-component method described in the disclosure can also be applied to other prediction coding tools with similar design spirits. For example, for the chroma from luma (CfL) in the AV1 standard, the proposed method can also be applied by dividing luma-chroma sample pairs into multiple sample groups.

It will be appreciated by those skilled that Y/Cb/Cr also can be denoted as Y/U/V in video coding area. If video data is of RGB format, the proposed method can also be applied by simply mapping YUV notation to GBR, for example.

Filter-Based Linear Model (FLM)

Figure 10B:
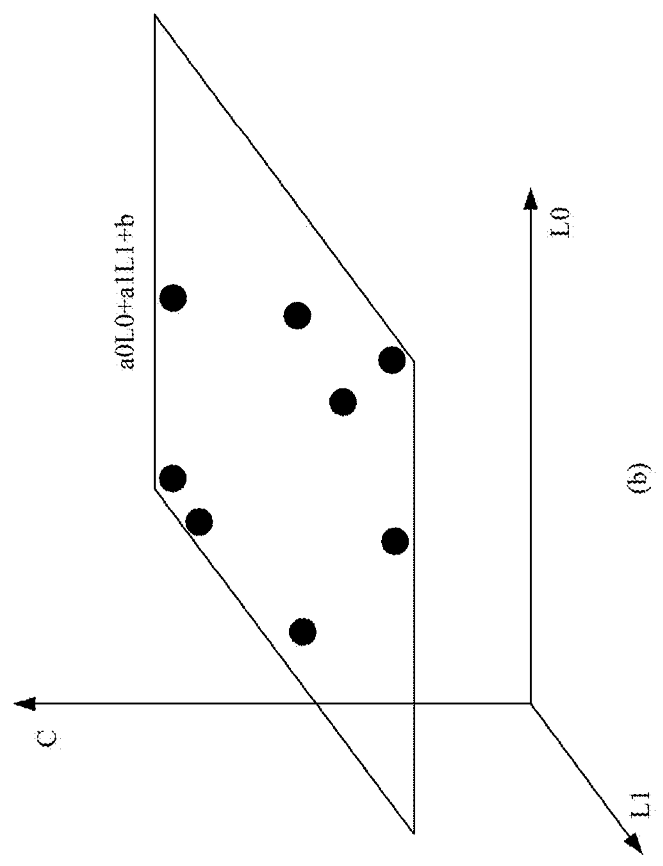
FIGS. 10A and 10B illustrate schematic diagrams for correlation among a chroma sample and one or more luma samples.
Figure 10A:
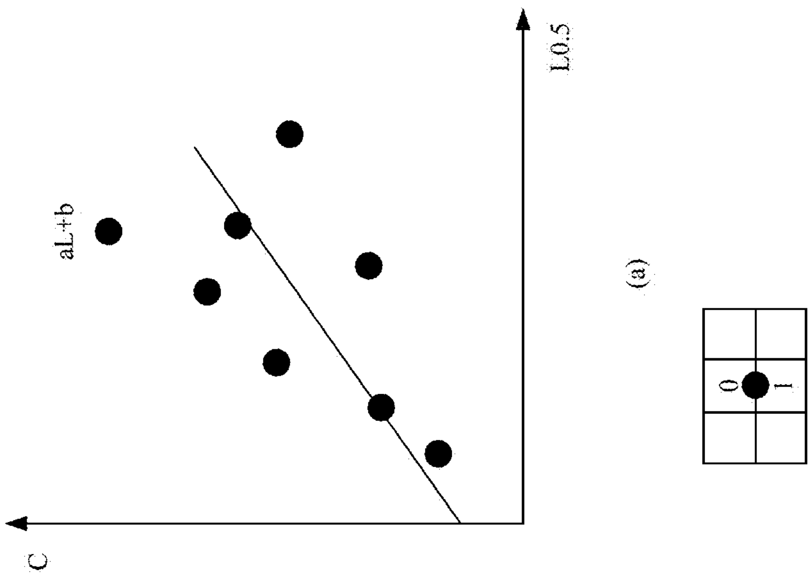

As shown in FIG. 10A, the CCLM assumes a given chroma sample only correlates to a corresponding luma sample (L0.5, which can be taken as the fractional luma sample position), and a simple linear regression (SLR) with ordinary least squares (OLS) estimation is used to predict the given chroma sample. However, as shown in FIG. 10B, in some video content, one chroma sample may simultaneously correlate to multiple luma samples (AC or DC correlation), so a multiple linear regression (MLR) model may further improve the prediction accuracy.

A filter-based linear model (FLM) which utilizes the MLR model is thus introduced as follows, to take into account the possibilities that one chroma sample may simultaneously correlate to multiple luma samples.

For a to-be-predicted chroma sample, the reconstructed collocated and neighboring luma samples can be used to predict the chroma sample, to capture the inter-sample correlation among the collocated luma sample, neighboring luma samples, and the chroma sample. The reconstructed luma samples are linear weighted and combined with one "offset" to generate the predicted chroma sample (C: predicted chroma sample, $L_i$: i-th reconstructed collocated or neighboring luma samples, $\alpha_i$: filter coefficients, β: offset, N: filter taps). Note the linear weighted plus offset value directly forms the predicted chroma sample (can be low pass, high pass adaptively according to video content), and it is then added by the residual to form the reconstructed chroma sample.

$$C = \sum_{i=0}^{N-1} \alpha_i \cdot L_i + \beta \tag{32}$$

Figure 11:
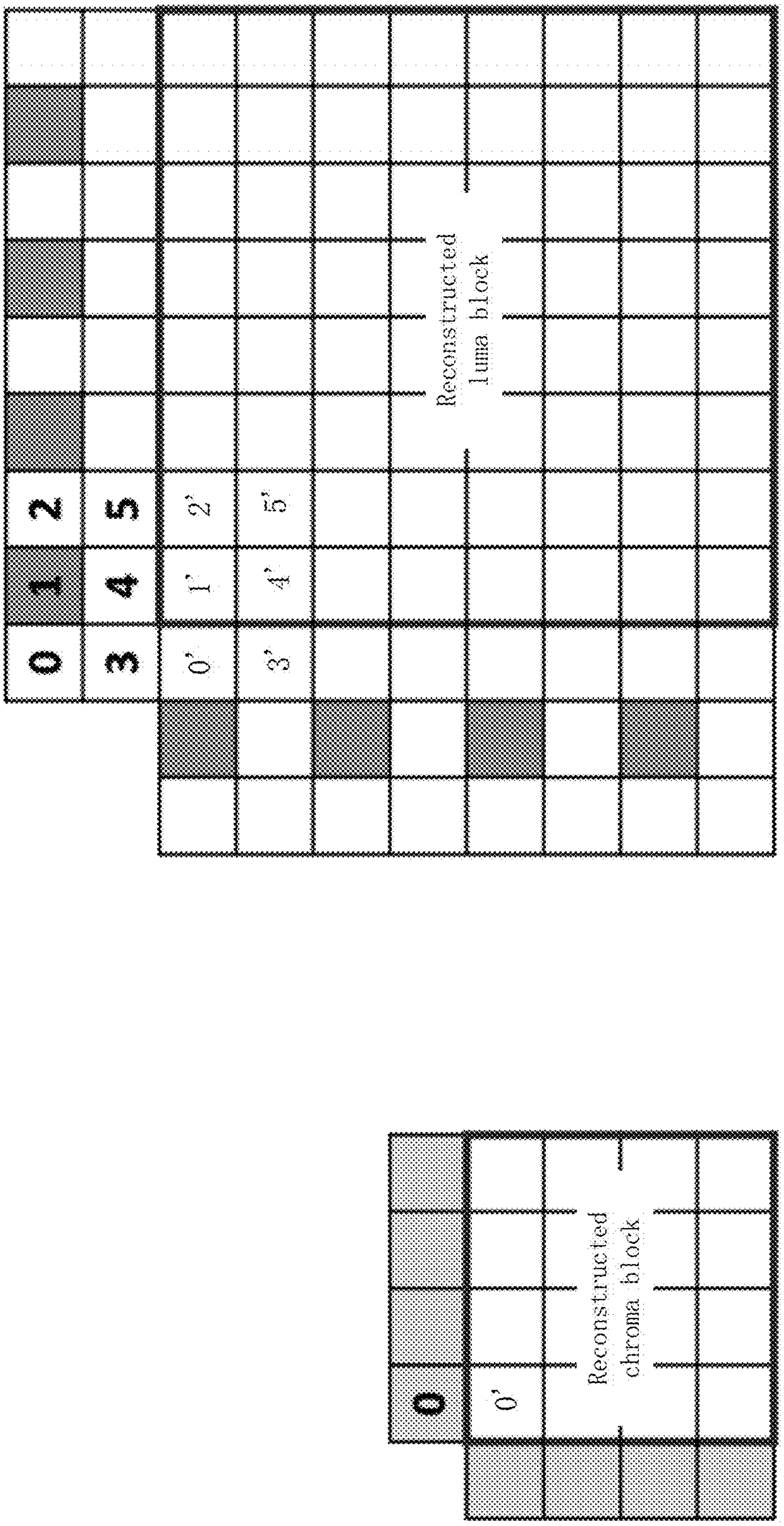
FIG. 11 illustrates an example that 6-tap is used in multiple linear regression (MLR) model according to one or more aspects of the present disclosure.

For a given CU, the top and left reconstructed luma and chroma samples can be used to derive or train the FLM parameters ($\alpha_i$, $\beta$). Like CCLM, $\alpha_i$ and $\beta$ can be derived via OLS. The top and left training samples are collected, and one pseudo inverse matrix is calculated at both encoder and decoder sides to derive the parameters, which are then used to predict the chroma samples in the given CU. Let N denotes the number of filter taps applied on luma samples, M denotes the total top and left reconstructed luma-chroma sample pairs used for training parameters, $L_j^i$ denotes luma sample with the i-th sample pair and the j-th filter tap, $C^i$ denotes the chroma sample with the i-th sample pair, the following equations show the derivation of the pseudo inverse matrix $A^+$, and also the parameters. FIG. 11 shows an example that N is 6 (6-tap), M is 8, top 2 rows and left 3 columns luma samples and top 1 row and left 1 column chroma samples are used to derive or train the parameters.

$$C^0 = \alpha_0 \cdot L_0^0 + \alpha_1 \cdot L_1^0 + \cdots + \alpha_{N-1} \cdot L_{N-1}^0 + \beta \quad (33)$$

$$C^1 = \alpha_0 \cdot L_0^1 + \alpha_1 \cdot L_1^1 + \cdots + \alpha_{N-1} \cdot L_{N-1}^1 + \beta$$

$$\vdots$$

$$C^{M-1} = \alpha_0 \cdot L_0^{M-1} + \alpha_1 \cdot L_1^{M-1} + \cdots + \alpha_{N-1} \cdot L_{N-1}^{M-1} + \beta$$

$$\begin{bmatrix} C^0 \\ C^1 \\ \vdots \\ \vdots \\ C^{M-1} \end{bmatrix} = \begin{bmatrix} L_0^0 & L_1^0 & \cdots & L_{N-1}^0 & 1 \\ L_0^1 & L_1^1 & \cdots & L_{N-1}^1 & 1 \\ \vdots & \vdots & \cdots & \vdots & \vdots \\ \vdots & \vdots & \cdots & \vdots & \vdots \\ L_0^{M-1} & L_1^{M-1} & \cdots & L_{N-1}^{M-1} & 1 \end{bmatrix} \begin{bmatrix} \alpha_0 \\ \alpha_1 \\ \vdots \\ \alpha_{N-1} \\ \beta \end{bmatrix}$$

$$b = Ax$$

$$x = (A^T A)^{-1} A^T b = A^+ b$$

Please note that one can predict the chroma sample by only $\alpha_i$ without the offset $\beta$, which may be a subset of the proposed method.

The proposed ELM/FLM/GLM (as discussed below) can be extended straightforwardly to the CfL design in the AV1 standard, which transmits model parameters ($\alpha$, $\beta$) explicitly. For example, (1-tap case) deriving $\alpha$ and/or $\beta$ at encoder at SPS/DPS/VPS/SEI/APS/PPS/PH/SH/Region/CTU/CU/Subblock/Sample levels, and signaled to decoder for the CfL mode.

To further improve the coding performance, additional designs may be used in the FLM prediction. As shown in FIG. 11 and discussed above, a 6-tap luma filter is used for the FLM prediction. However, though a multiple tap filter can fit well on training data (e.g., top and left neighboring reconstructed luma and chroma samples), in some cases that training data do not capture full characteristics of testing data, it may result in overfitting and may not predict well on testing data (i.e., the to-be-predicted chroma block samples). Also, different filter shapes may adapt well to different video block content, leading to more accurate prediction.

To address this issue, the filter shape and number of filter taps can be predefined or signaled or switched in Sequence Parameter Set (SPS), Adaptation Parameter Set (APS), Picture Parameter Set (PPS), Picture Header (PH), Slice Header (SH), Region, CTU, CU, Subblock, or Sample level. A set of filter shape candidates can be predefined, and a selection on the set of filter shape candidates may be signaled or switched in SPS, APS, PPS, PH, SH, Region, CTU, CU, Subblock, or Sample level. Different components (e.g., U and V) may have different filter switch control. For example, a set of filter shape candidates (e.g., indicated by index 0~5) may be predefined, and a filter shape (1, 2) may denote a 2-tap luma filter, a filter shape (1, 2, 4) may denote a 3-tap luma filter and the like, as shown in FIG. 11. The filter shape selection of U and V components can be switched in PH or in CU or CTU level. Note N-tap can represent N-tap with or without the offset $\beta$ as described herein. One example is given as below in Table 8.

TABLE 8

Exemplary signaling and switching for different filter shapes

| predefined filter shape candidates: | | # of filter taps | filter shape |
|---|---|---|---|
| idx | 0 | 2 | (1, 2) |
| idx | 1 | 2 | (1, 4) |
| idx | 2 | 2 | (1, 5) |
| idx | 3 | 3 | (1, 2, 4) |
| idx | 4 | 4 | (1, 2, 4, 5) |
| idx | 5 | 6 | (0, 1, 2, 3, 4, 5) |

| POC | comp | selected filter shape idx | |
|---|---|---|---|
| 0 | U | 3 | PH switch |
| | V | 0~5 | CU switch |
| 1 | U | 4 | PH switch |
| | V | 0~2 | CTU switch |

Figure 12:
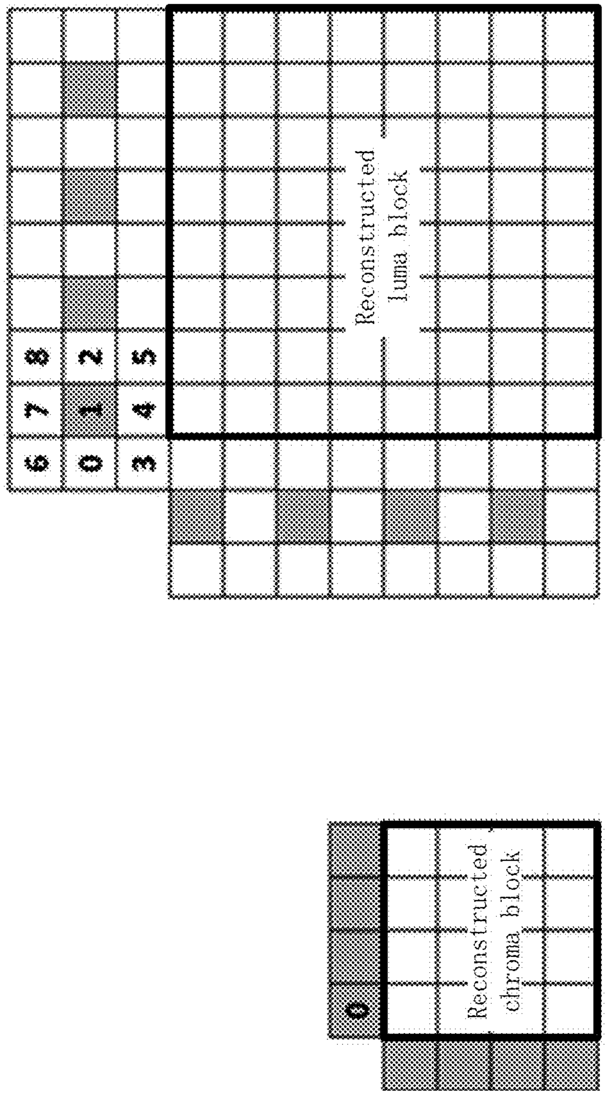
FIG. 12 illustrates exemplary different filter shapes and/or numbers of taps according to one or more aspects of the present disclosure.

Different chroma types and/or color formats can have different predefined filter shapes and/or taps. For example, a predefined filter shape (1, 2, 4, 5) may be used for 4:2:0 type-0, a predefined filter shape (0, 1, 2, 4, 7) may be used for 4:2:0 type-2, and a predefined filter shape (1, 4) may be used for 4:2:2, and a predefined filter shape (0, 1, 2, 3, 4, 5) may be used for 4:4:4, as shown in FIG. 12.

In another aspect of the present disclosure, unavailable luma and chroma samples for deriving the MLR model can be padded from available reconstructed samples. For example, if using a 6-tap (0, 1, 2, 3, 4, 5) filter as in FIG. 12, for a CU located at the left picture boundary, the left columns including samples (0, 3) are not available (out of picture boundary), so samples (0, 3) are repetitive padding from samples (1, 4) to apply the 6-tap filter. Note that the padding process may be applied in both training data (top and left neighboring reconstructed luma and chroma samples) and testing data (the luma and chroma samples in the CU(s)).

As mentioned above, an MLR model (linear equations) must be derived at both the encoder and the decoder. According to one or more aspects of the present disclosure, several methods are proposed to derive the pseudo inverse matrix $A^+$, or to directly solve the linear equations. Other known methods like Newton's method, Cayley-Hamilton method, and Eigendecomposition as mentioned in en.wikipedia.org/wiki/Invertible_matrix can also be applied.

In the present disclosure, $A^+$ can be denoted as $A^{-1}$ for simplification. The linear equations may be solved as follows 1. Solving $A^{-1}$ by adjugate matrix (adjA), closed form, analytic solution:

Below shows one n×n general form, one 2×2 and one 3×3 cases. If FLM uses 3×3, 2 scalers plus one $$b = Ax,\ x = (A^T A)^{-1} A^T b = A^+ b, \text{ denoted as } A^{-1} b$$

$$A^{-1} = \frac{1}{\det A} adjA \ (adjA)_{ij} = (-1)^{i+j} \det \tilde{A}_{ji}$$

$\bar{A}_{ji}$: (n−1)×(n−1) submatrix by removing j-th row and i-th column $$A-1=\begin{bmatrix} a & b \\ d & d \end{bmatrix}^{-1}=\frac{1}{\det A}\begin{bmatrix} \tilde{A}_{11} & -\tilde{A}_{21} \\ -\tilde{A}_{12} & \tilde{A}_{22} \end{bmatrix}=\frac{1}{\det A}\begin{bmatrix} d & -b \\ -c & a \end{bmatrix}$$

$$A^{-1}=\begin{bmatrix} a_{11} & a_{12} & a_{13} \\ a_{21} & a_{22} & a_{23} \\ a_{31} & a_{32} & a_{33} \end{bmatrix}^{-1}=\frac{1}{\det A}\begin{bmatrix} \begin{vmatrix} a_{22} & a_{23} \\ a_{32} & a_{33} \end{vmatrix} & -\begin{vmatrix} a_{12} & a_{13} \\ a_{32} & a_{33} \end{vmatrix} & \begin{vmatrix} a_{12} & a_{13} \\ a_{22} & a_{23} \end{vmatrix} \\ -\begin{vmatrix} a_{21} & a_{23} \\ a_{31} & a_{33} \end{vmatrix} & \begin{vmatrix} a_{11} & a_{13} \\ a_{31} & a_{33} \end{vmatrix} & -\begin{vmatrix} a_{11} & a_{13} \\ a_{21} & a_{23} \end{vmatrix} \\ \begin{vmatrix} a_{21} & a_{22} \\ a_{31} & a_{32} \end{vmatrix} & -\begin{vmatrix} a_{11} & a_{22} \\ a_{31} & a_{32} \end{vmatrix} & \begin{vmatrix} a_{11} & a_{12} \\ a_{21} & a_{22} \end{vmatrix} \end{bmatrix}$$

offset need be solved.

2. Gauss-Jordan Elimination

The linear equations can be solved using Gauss-Jordan elimination, by an augmented matrix $[A\ I_n]$ and a series of elementary row operation to obtain the reduced row echelon form [I|X]]. Below shows 2×2 and 3×3 examples.

$$\left[\begin{array}{cc|cc} a & b & 1 & 0 \\ c & d & 0 & 1 \end{array}\right]\to\left[\begin{array}{cc|cc} a & b & 1 & 0 \\ 0 & ad-bc & -c & a \end{array}\right]\to\left[\begin{array}{cc|cc} a & b & 1 & 0 \\ 0 & 1 & \frac{-c}{ad-bc} & \frac{a}{ad-bc} \end{array}\right]\to$$

$$\left[\begin{array}{cc|cc} a & 0 & \frac{ad}{ad-bc} & \frac{-ab}{ad-bc} \\ 0 & 1 & \frac{-c}{ad-bc} & \frac{a}{ad-bc} \end{array}\right]\to\left[\begin{array}{cc|cc} 1 & 0 & \frac{d}{ad-bc} & \frac{-b}{ad-bc} \\ 0 & 1 & \frac{-c}{ad-bc} & \frac{a}{ad-bc} \end{array}\right]$$

$$\left[\begin{array}{ccc|ccc} 2 & 2 & 5 & 1 & 0 & 0 \\ -2 & 1 & 2 & 0 & 1 & 0 \\ 6 & 3 & 9 & 0 & 0 & 1 \end{array}\right]\to\left[\begin{array}{ccc|ccc} 2 & 2 & 5 & 1 & 0 & 0 \\ 0 & 3 & 7 & 1 & 1 & 0 \\ 0 & -3 & -6 & -3 & 0 & 1 \end{array}\right]\to$$

$$\left[\begin{array}{ccc|ccc} 2 & 2 & 5 & 1 & 0 & 0 \\ 0 & 3 & 7 & 1 & 1 & 0 \\ 0 & 0 & 1 & -2 & 1 & 1 \end{array}\right]\to\left[\begin{array}{ccc|ccc} 2 & 0 & 2 & 11 & -5 & -5 \\ 0 & 3 & 0 & 15 & -6 & -7 \\ 0 & 0 & 1 & -2 & 1 & 1 \end{array}\right]\to$$

$$\left[\begin{array}{ccc|ccc} 2 & 2 & 0 & 11 & -5 & -5 \\ 0 & 1 & 0 & 5 & -2 & -\frac{7}{3} \\ 0 & 0 & 1 & -2 & 1 & 1 \end{array}\right]\to\left[\begin{array}{ccc|ccc} 2 & 0 & 0 & 1 & -1 & -\frac{1}{3} \\ 0 & 1 & 0 & 5 & -2 & -\frac{7}{3} \\ 0 & 0 & 1 & -2 & 1 & 1 \end{array}\right]\to$$

$$\left[\begin{array}{ccc|ccc} 1 & 0 & 0 & \frac{1}{2} & -\frac{1}{2} & -\frac{1}{6} \\ 0 & 1 & 0 & 5 & -2 & -\frac{7}{3} \\ 0 & 0 & 1 & -2 & 1 & 1 \end{array}\right]$$

3. Cholesky decomposition

To solve Ax=b, A can be firstly decomposed by Cholesky-Crout algorithm, leading to one upper triangular and one lower triangular matrices, and one forward substitution plus one backward substitution can be applied in serial to obtain the solution. Below shows a 3×3 example.

$$A=\begin{bmatrix} a_{11} & a_{12} & a_{13} \\ a_{21} & a_{22} & a_{23} \\ a_{31} & a_{32} & a_{33} \end{bmatrix}=GG^T$$

$$=\begin{bmatrix} g_{11} & 0 & 0 \\ g_{21} & g_{22} & 0 \\ g_{31} & g_{32} & g_{33} \end{bmatrix}\begin{bmatrix} g_{11} & g_{12} & g_{31} \\ 0 & g_{22} & g_{32} \\ 0 & 0 & g_{33} \end{bmatrix}$$

$$=\begin{bmatrix} g_{11}^2 & g_{11}g_{11} & g_{31}g_{11} \\ g_{21}g_{11} & g_{21}^2+g_{22}^2 & g_{31}g_{21}+g_{32}g_{22} \\ g_{31}g_{11} & g_{31}g_{21}+g_{32}g_{22} & g_{31}^2+g_{32}^2+g_{33}^2 \end{bmatrix}$$

$$g_{11}=\sqrt{a_{11}}$$

$$g_{21}=\frac{a_{21}}{g_{11}}$$

-continued $$g_{31}=\frac{a_{31}}{g_{11}}$$

$$g_{22}=\sqrt{a_{22}-g_{21}^2}$$

$$g_{32}=\frac{1}{g_{22}(a_{32}-g_{31}^2-g_{32}^2)}$$

$$g_{33}=\frac{1}{g_{22}}(a_{32}-g_{31}g_{21})$$

$$g_{jj}=\sqrt{a_{jj}-\sum_{k=1}^{j-1}g_{jk}^2}$$

$$g_{ij}=\frac{1}{g_{ij}}\left(a_{jj}-\sum_{k=1}^{j-1}g_{ik}g_{jk}\right),\ i=j+1,\ j+2,\ \ldots,\ n$$

Apart from the above examples, some conditions need special handling. For example, if some conditions result in that the linear equations cannot be solved, default values can be used to fill the chroma prediction values. The default values can be predefined or signaled or switched in SPS/DPS/VPS/SEI/APS/PPS/PH/SH/Region/CTU/CU/Sub-block/Sample levels, for example, when predefined 1<<(bitDepth−1), meanC, meanL, or meanC-meanL (mean current chroma or other chroma, luma values from available, or subset of FLM reconstructed neighboring region).

The following examples represent situations when the matrix A cannot be solved, where default prediction values may be assigned to the whole current block:

1. Solving by closed form (analytic, adjugate matrix), but A is singular, (i.e., detA=0);
2. Solving by Cholesky decomposition, but A cannot be Cholesky decomposed, $g_{jj}$<REG_SQR, where REG_SQR is one small value, can be predefined or signaled or switched in SPS/DPS/VPS/SEI/APS/PPS/PH/SH/Region/CTU/CU/Subblock/Sample levels.

FIG. 11 shows a typical case that the FLM parameters are derived using top 2 and/or left 3 luma lines and top 1 and/or left 1 chroma lines. However, using different region for parameter derivation may bring coding benefit because of different block content and the reconstructive quality of different neighboring samples, as mentioned above. Several ways to choose the applied region for parameter derivation are proposed below:

1. Similar to MDLM, the FLM derivation can only use top or left luma and/or chroma samples to derive the parameters. Whether to use FLM, FLM_L, or FLM_T can be predefined or signaled or switched in SPS/DPS/VPS/SEI/APS/PPS/PH/SH/Region/CTU/CU/Sub-block/Sample levels. Suppose that a current chroma block has a size of W×H, then W' and H' are obtained as follows:
   W'=W. H'=H when FLM mode is applied;
   W'=W+We when FLM_T mode is applied; where We denotes extended top luma/chroma samples;
   H'=H+He when FLM_L mode is applied; where He denotes extended left luma/chroma samples.

The number of extended luma/chroma samples (We, He) can be predefined, or signaled or switched in SPS/DPS/VPS/SEI/APS/PPS/PH/SH/Region/CTU/CU/Sub-block/Sample levels.

For example, predefine (We, He)=(H. W) as the VVC CCLM, or (W. H) as the ECM CCLM. The unavailable (We, He) luma/chroma samples can be repetitive padded from the nearest (horizontal, vertical) luma/chroma samples.

Figure 13:
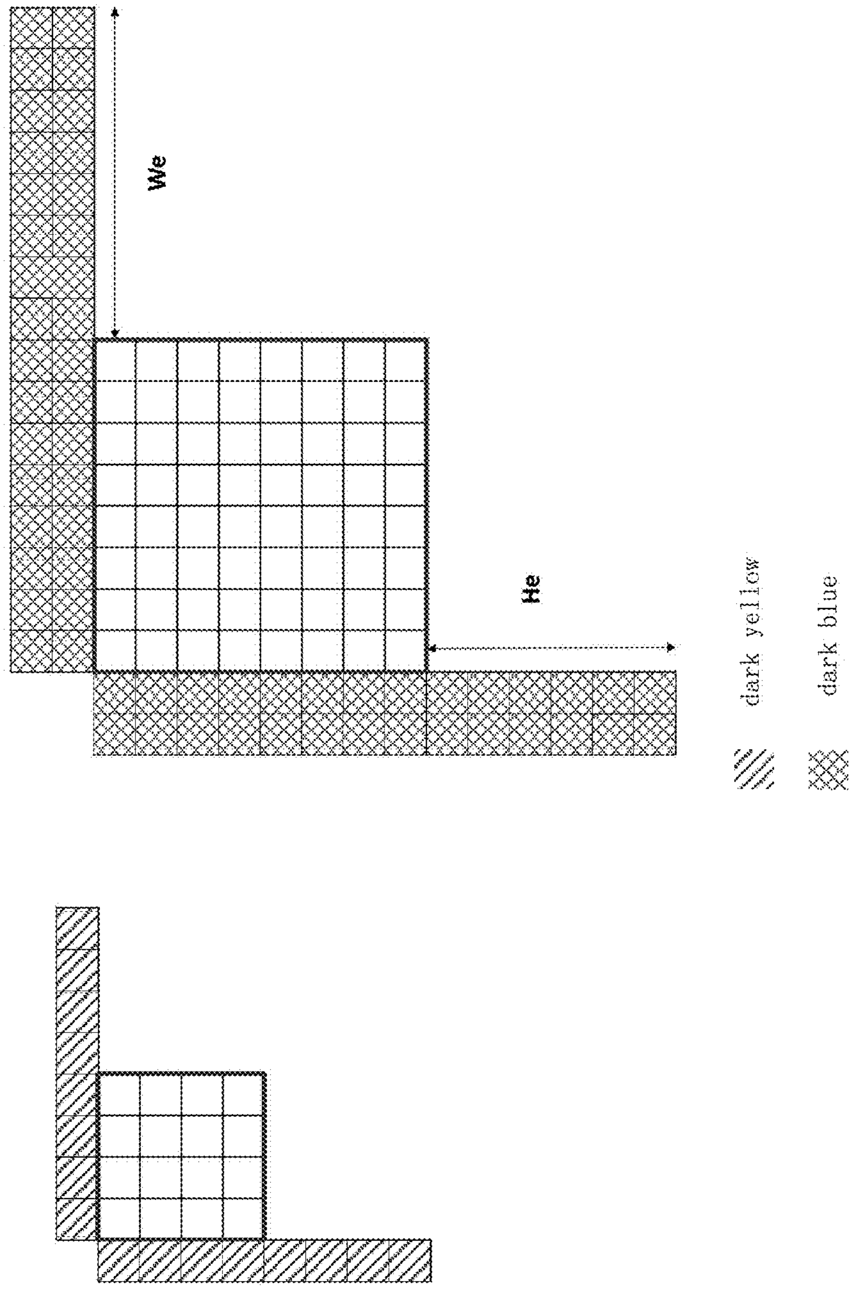
FIG. 13 illustrates an example in which FLM can only use top or left luma and/or chroma samples (extended) for parameter derivation.

FIG. 13 shows an illustration of FLM_L and FLM_T (e.g., under 4 tap). When FLM_L or FLM_T is applied, only H' or W' luma/chroma samples are used for parameter derivation, respectively.

2. Similar to MRL, different line index can be predefined, or signaled or switched in SPS/APS/PPS/PH/SH/Region/CTU/CU/Subblock/Sample levels, to indicate the selected luma-chroma sample pair line. This may benefit from different reconstructive quality of different line samples.

Figure 14:
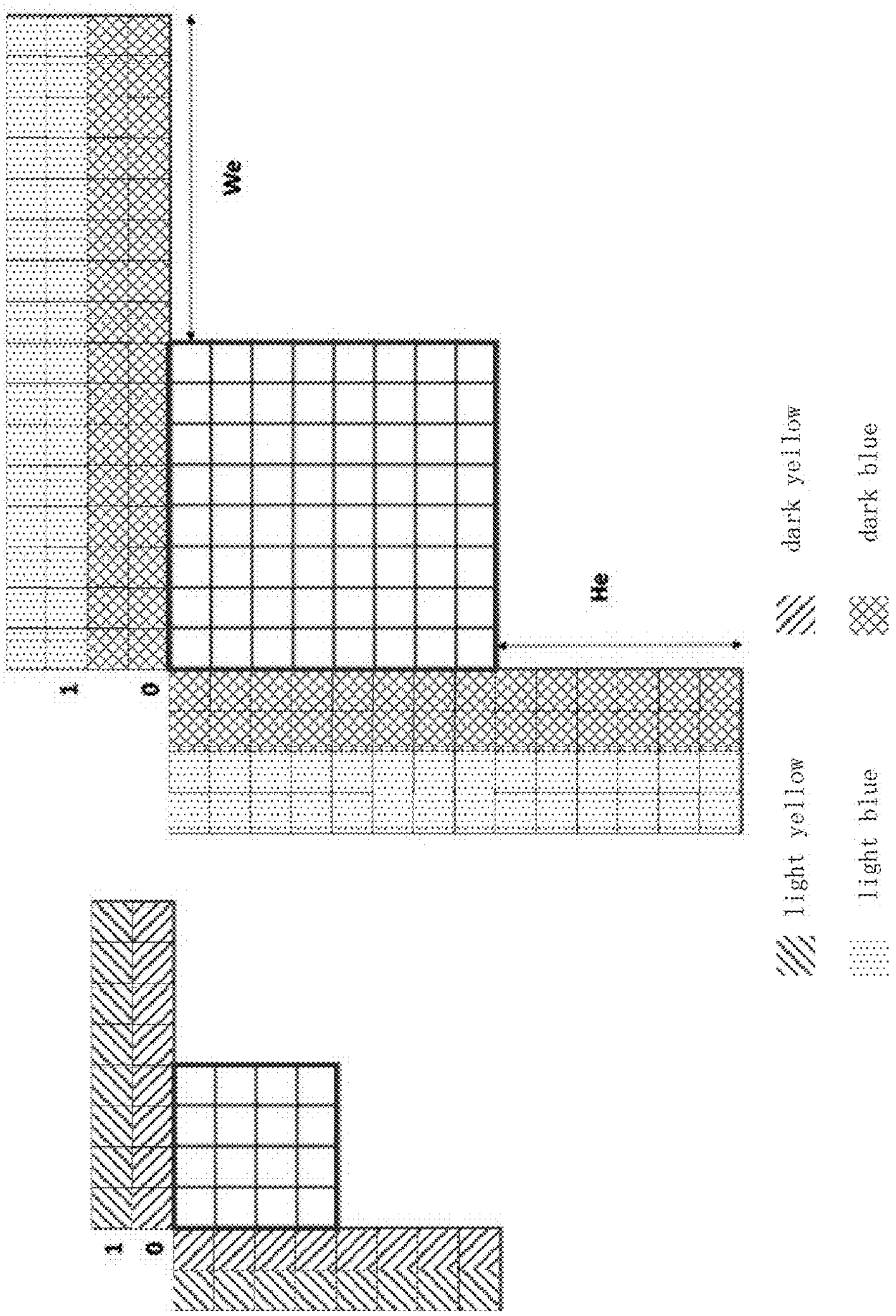
FIG. 14 illustrates an example in which FLM can use different lines for parameter derivation.

FIG. 14 shows that similar to MRL, FLM can use different lines for parameter derivation (e.g., under 4 tap). For example, FLM can use light blue/yellow luma and/or chroma samples in index 1.

3. Extend CCLM region and take full top N and/or left M lines for parameter derivation. FIG. 14 shows all dark and light blue and yellow region can be used at one time. Training using larger region (data) may lead to a more robust MLR model.

Corresponding syntax may be defined as below in Table 9 for the FLM prediction. Wherein FLC represents fixed length code, TU represents truncated unary code, EGk represents exponential-golomb code with order k, where k can be fixed or signaled/switched in SPS/DPS/VPS/SEI/APS/PPS/PH/SH/Region/CTU/CU/Subblock/Sample levels, SVLC represents signed EG0, and UVLC represents unsigned EG0.

TABLE 9

An example of FLM syntax

| Level | Syntax element | Binarization | Meaning |
|---|---|---|---|
| SPS | flm_enabled_flag | FLC | whether FLM is enabled in the sequence, can be inferred off when chromaFormat == CHROMA_400, or CCLM is off |
| PH/SH | ph_flm_cb_flag<br>ph_flm_cr_flag | FLC | whether FLM is enabled in this picture/slice for Cb/Cr, can be inferred off when chromaFormat == CHROMA_400, or CCLM is off |
| PH/SH | ph_flm_cb_ctb_control_flag<br>ph_flm_cr_ctb_control_flag | FLC | whether to enable Cb/Cr on/off control at CTB level |
| CTU | ctb_flm_cb_flag<br>ctb_flm_cr_flag | CABAC | whether FLM is enabled for the current Cb or Cr CTB, can be CABAC bypass coded or with N contexts (2: up/left, or N neighboring CTBs) |
| CU | cu_flm_cb_flag<br>cu_flm_cr_flag | CABAC, TU | whether FLM is enabled for the current Cb or Cr CU, can be CABAC bypass coded or with N contexts (2: up/left, or N neighboring CUs) |
| CU | flm_cb_filter_idx<br>flm_cr_filter_idx | CABAC, TU | which filter shape idx (in the predefined set) is used for the CU, can be CABAC bypass coded or with N contexts (2: up/left, or N neighboring CUs) |
| CU | flm_cb_mdlm_idx<br>flm_cr_mdlm_idx | CABAC, TU | which MDLM idx (FLM, FLM_L, FLM_T) is used for the CU, can be CABAC bypass coded or with N contexts (2: up/left, or N neighboring CUs) |
| CU | flm_cb_mrl_idx<br>flm_cr_mrl_idx | CABAC, TU | which FLM MRL idx (e.g., 0, 1) is used for the CU, can be CABAC bypass coded or with N contexts (2: up/left, or N neighboring CUs) |

Note that the binarization of each syntax element can be changed.

A new method for cross-component prediction is proposed on the basis of the existing linear model designs, in order to further improve coding accuracy and efficiency. Main aspects of the proposed method are detailed as follows.

Though the above discussed FLM provides the best flexibility (leading to the best performance), it requires to solve many unknown parameters if the number of filter taps goes up. When the inverse matrix is larger than 3×3, the closed form derivation is not suitable (too many multipliers), and iterative methods like Cholesky are needed, which burden decoder processing cycles. In this section, pre-operations before applying the linear model are proposed, including utilizing the sample gradients to exploit the correlation between luma AC information and chroma intensities. With the help of gradients, the number of filter taps can be efficiently reduced.

Please note that methods/examples in this section can be combined/reused from any of the designs discussed above, including but not limited to classification, filter shape, matrix derivation (with special handling), applied region, syntax. Moreover, methods/examples listed in this section can also be applied in any of the designs discussed above, to have a better performance with certain complexity trade-off.

Please note that reference samples/training template/reconstructed neighboring region as used herein usually refers to the luma samples used for deriving the MLR model parameters, which are then applied to the inner luma samples in one CU, to predict the chroma samples in the CU.

According to the proposed method, instead of directly using luma sample intensity values as the input of the linear model, pre-operations (e.g., pre linear weighted, sign, scale/abs, thresholding, ReLU) can be applied to downgrade the dimension of unknown parameters. In one example, the pre-operations may comprise calculating sample differences based on the luma sample values. As understood by one skilled in the art, the sample differences may be characterized as gradients, and thus this new method is also referred to as gradient linear model (GLM) in certain embodiments.

Please note that the following detailed description discuss scenarios wherein the proposed pre-operations may be reused for/combined with the SLR model (also referred to as 1-tap case), and reused for/combined with the MLR model (also referred to as multi-tap case, for example, 2-tap).

Figure 15:
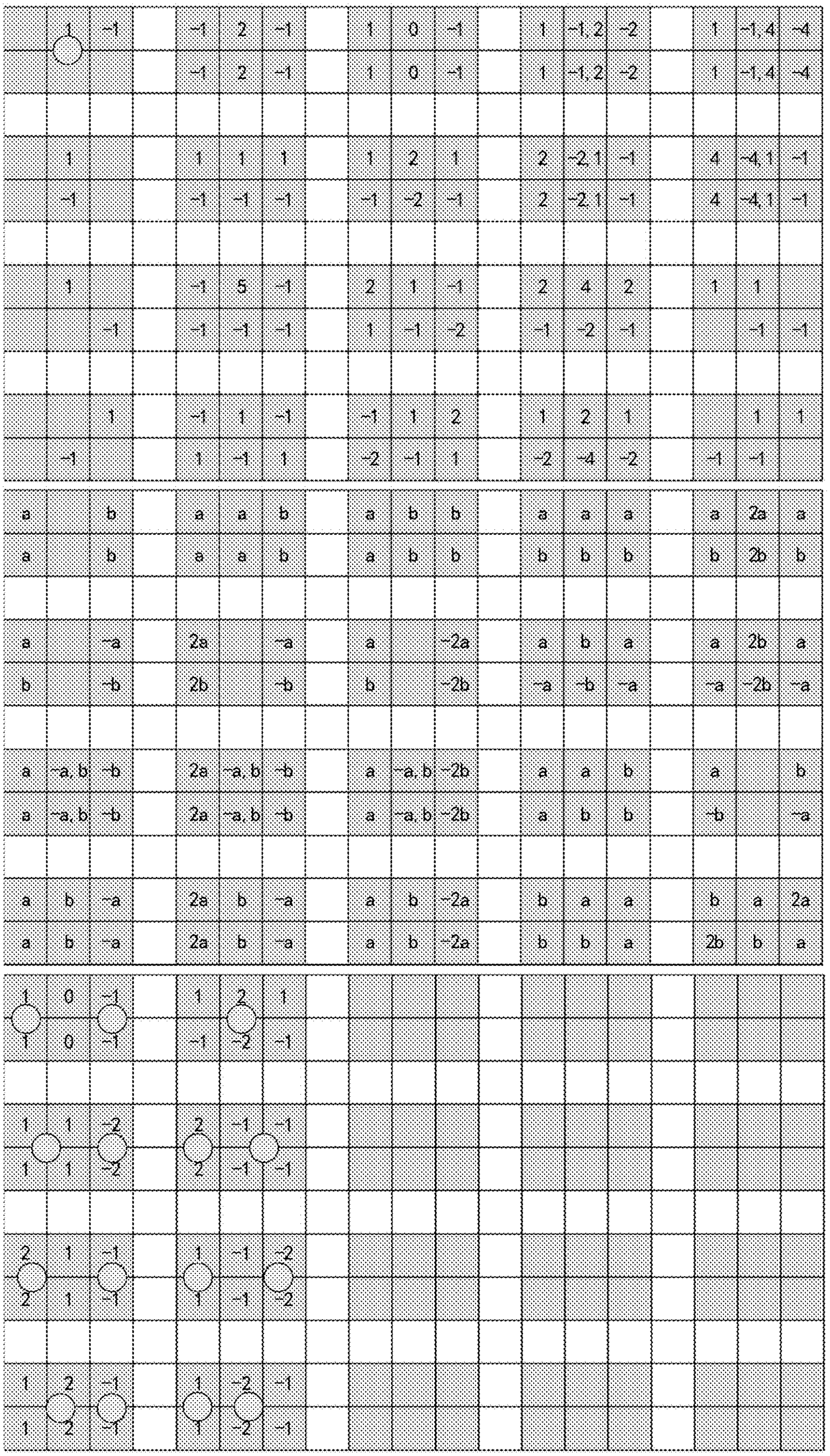
FIG. 15 illustrates some examples for 1-tap/2-tap pre-operations.

For example, instead of applying 2-tap on 2 luma samples, the 2 luma samples can be pre-operated, then a simpler 1-tap can be applied to reduce complexity. FIG. 15 shows some examples for 1-tap/2-tap (with offset) pre-operations, where 2-tap coefficients are denoted as (a, b), please note that each circle as illustrated in FIG. 15 represents a illustrative chroma position in the YUV 4:2:0 format. As discussed above, in the YUV 4:2:0 format, a luma sample corresponding to a chroma sample may be obtained by performing a down-sampling operation on more than one (e.g., 4) reconstructed luma samples corresponding to the chroma sample (e.g., located around the chroma sample). In other words, the chroma position may correspond to corresponding to one or more luma samples comprising a collocated luma sample. The different 1-tap patterns are designed for different gradient directions and using different "interpolated" luma samples (weighting to different luma location) for gradient calculation. For example, one typical filter [1, 0, −1; 1, 0, −1] is shown in FIG. 15, which represents the following operations:

$$Rec''_L(i,j)=\begin{bmatrix} rec_L(2i-1,2j-1)-rec_L(2i+1,2j-1)+ \\ rec_L(2i-1,2j)-rec_L(2i+1,2j) \end{bmatrix} \quad (34)$$

Wherein $rec_L$ represents the reconstructed luma sample values and $Rec_L''(i, j)$ represents the pre-operated luma sample values. Please also note that the 1-tap filters as shown in FIG. 15 may be understood as alternatives for the down-sampling filters as used in CCLM (please refer to equations (6)-(7)), with changed filter coefficients.

Pre-operations can be according to gradients, edge direction (detection), pixel intensity, pixel variation, pixel variance, Roberts/Prewitt/compass/Sobel/Laplacian operator, high-pass filter (by calculating gradients or other relevant operators), low-pass filter (by performing weighted-average operations) . . . etc. The edge direction detectors listed in the examples can be extended to different edge directions. For example, 1-tap (1, −1) or 2-tap (a, b) applied along different directions to detect different edge gradients. The filter shape/coefficients can be symmetric with respect to the chroma position, as the FIG. 15 examples (420 type-0 case).

The pre-operation parameters (coefficients, sign, scale/abs, thresholding, ReLU) can be fixed or signaled/switched in SPS/DPS/VPS/SEI/APS/PPS/PH/SH/Region/CTU/CU/Subblock/Sample levels. Note in the examples, if multiple coefficients apply on one sample (e.g., −1, 4), then they can be merged (e.g., 3) to reduce operations.

In one example, the pre-operations may relate to calculating sample differences of the luma sample values. Alternatively, the pre-operations may comprise performing down-sampling by weighted-average operations. In certain cases, the pre-operations can be applied repeatedly. For example, one may apply one template filtering to template to remove outliers using the low-pass smoothing FIR filter [1, 2, 1]/4, or [1, 2, 1; 1, 2, 1]/8 (i.e., down-sampling) and then apply 1-tap GLM filter to calculate the sample differences to derive the linear model. It may be contemplated that one may also calculate the sample differences and then enabling down-sampling.

In one example, the pre-operation coefficients (finally applied (e.g., 3), or middle applied (e.g., −1, 4) to per luma sample) can be limited to power-of-2 values to save multipliers.

In one aspect of the present disclosure, the proposed new method may be reused for/combined with the above discussed CCLM, which utilizing a simple linear regression (SLR) model and using one corresponding luma sample value to predict the chroma sample value. This is also referred to as a 1-tap case. In this case, deriving the linear model further comprises deriving a scale parameter α and an offset parameter β by using the pre-operated neighboring luma sample values and the neighboring chroma sample values. Or, the linear model may be re-written as:

$$C=\alpha\cdot L+\beta \quad (35)$$

Wherein L here represents "pre-operated" luma samples. The parameter derivation of 1-tap GLM can reuse CCLM design, but taking directional gradient into consideration (may be with high-pass filter). In one example, the scale parameter α may be derived by utilizing a division look-up table, as detailed below, to enable simplification.

In one example, when combining GLM with the SLR model, the scale parameter α and the offset parameter β may be derived by utilizing the above-discussed min-max method. Specifically, the scale parameter α and the offset parameter β may be derived by: comparing the pre-operated neighboring luma sample values to determine a minimum luma sample value $Y_A$ and a maximum luma sample value $Y_B$; determining corresponding chroma samples values $X_A$ and $X_B$ for the minimum luma sample value $Y_A$ and the maximum luma sample value $Y_B$, respectively; and deriving the scale parameter α and the offset parameter β based on the minimum luma sample value $Y_A$, the maximum luma sample value $Y_B$, and the corresponding chroma samples values $X_A$ and $X_B$ according to the following equations:

$$\alpha=\frac{Y_A-Y_B}{X_A-X_B};\quad \beta=Y_A-\alpha X_A. \quad (36)$$

In one example, when combining GLM with the SLR model, the above discussed scale adjustment may be reused. In this case, the encoder may determine a scale adjustment value (for example, "u") to be signaled in the bitstream and add the scale adjustment value to the derived scale parameter α. The decoder may determine the scale adjustment value (for example, "u") from the bitstream and add the scale adjustment value to the derived scale parameter α. The added value are finally used to predict the internal chroma sample values.

In one aspect of the present disclosure, the proposed new method may be reused for/combined with FLM, which utilizing a multiple linear regression (MLR) model and using multiple luma sample values to predict the chroma sample value. This is also referred to as a multi-tap case, for example, 2-tap. In this case, the linear model may be re-written as:

$$C^0 = \alpha \cdot L^0 + \beta \tag{37}$$

$$C^1 = \alpha \cdot L^1 + \beta$$

$$\vdots$$

$$C^{M-1} = \alpha \cdot L^{M-1} + \beta$$

$$\begin{bmatrix} C^0 \\ C^1 \\ \vdots \\ C^{M-1} \end{bmatrix} = \begin{bmatrix} L^0 & 1 \\ L^1 & 1 \\ \vdots & \vdots \\ L^{M-1} & 1 \end{bmatrix} \begin{bmatrix} \alpha \\ \beta \end{bmatrix}$$

$$b = Ax$$

$$x = (A^T A)^{-1} A^T b = A^+ b$$

$$\alpha = \frac{n\sum x_k y_k - \sum x_k \sum y_k}{n\sum x_k^2 - \left(\sum x_k\right)^2} = \frac{A_1}{A_2}$$

$$\beta = \frac{\sum y_k - \alpha \sum x_k}{n} = \bar{y} - \alpha \bar{x}$$

In this case, multiple scale parameters α and an offset parameter β may be derived by using the pre-operated neighboring luma sample values and the neighboring chroma sample values. In one example, the offset parameter β is optional. In one example, at least one of the multiple scale parameters α may be derived by utilizing the sample differences. Moreover, another of the multiple scale parameters α may be derived by utilizing the down-sampled luma sample value. In one example, at least one of the multiple scale parameters α may be derived by utilizing horizontal or vertical sample differences calculated on the basis of down-sampled neighboring luma sample values. In other words, the linear model may combine multiple scale parameters α asscosicated with different pre-opertaions.

Implicit Filter Shape Derivation

In one example, instead of explicitly signaling the selected filter shape index, the used direction oriented filter shape can be derived at decoder to save bit overhead. For example, at the decoder, a number of directional gradient filters may be applied for each reconstructed luma sample of the L-shaped template of the i-th neighboring row and column of the current block. Then the filtered values (gradients) may be accumulated for each direction of the number of directional gradient filters respectively. In an example, the accumulated value is an accumulated value of absolute values of corresponding filtered values. After the accumulation, the direction of the directional gradient filter for which the accumulated value is the largest may be determined as the derived (luma) gradient direction. For example, a Histogram of Gradients (HoG) may be built to determine the largest value. The derived direction can be further applied as the direction for predicting chroma samples in the current block.

The following example involves reusing the decoder-side intra mode derivation (DIMD) method for luma intra prediction included in ECM-4.0:

Step 1: applying 2 kinds of directional gradient filters (3×3 hor/ver Sobel) for each reconstructed luma sample of the L-shaped template of the $2^{nd}$ neighboring row and column of the current block;

Step 2: accumulating filtered values (gradients) by SAD (sum of absolute differences) for each of the directional gradient filters;

Step 3: Build a Histogram of Gradients (HoG) based on the accumulating filtered values; and Step 4: The largest value in HoG is determined to be the derived (luma) gradient direction, based on which the GLM filter may be determined.

In one example, if the shape candidates are [−1, 0, 1; −1, 0, 1] (horizontal) and [1, 2, 1; −1, −2, −1] (vertical), when the largest value is associated with the horizontal shape, then use shape [−1, 0, 1; −1, 0, 1] for GLM based chroma prediction.

The gradient filter used for deriving the gradient direction can be the same or different with the GLM filter in shape. For example, both of the filters may be horizontal [−1, 0, 1; −1, 0, 1], or the two filters may have different shapes, while the GLM filter may be determined based on the gradient filter.

The proposed GLM can be combined with above discussed MMLM or ELM. When combined with classification, each group can share or have its own filter shape, with syntaxes indicating shape for each group. For example, as a exemplary classifier, horizontal gradients grad_hor may be classified into a first group, which correspond to a first linear model, and vertical gradients grad_ver may be classified into a second group, which correspond to a second linear model. In one example, the horizontal luma patterns may be generated only once.

Further possible classifiers are also provided as follows. With the classifiers, the neighboring and internal luma-chroma sample pairs of the current video block may be classified into multiple groups based on one or more thresholds. Please note that, as discussed above, each neighboring/internal chroma sample and its corresponding luma sample may be referred to as a luma-chroma sample pair. The one or more thresholds are associated with intensities of neighboring/internal luma samples. In this case, each of the multiple groups corresponds to a respective one of the plurality of linear models.

When combining with MMLM classifier, the following operations may be performed: classifying neighboring reconstructed luma-chroma sample pairs of the current video block into 2 groups based on Threshold; deriving different linear models for different groups, wherein the deriving process may be GLM simplified, i.e., with the above pre-operations to reduce the number of taps; classifying luma-chroma sample pairs inside the CU (internal luma-chroma sample pairs, wherein each of the internal luma-chroma sample pairs comprises an internal chroma sample value to be predicted with the derived linear model) into 2 groups similarly based on Threshold; applying different linear models to the reconstructed luma samples in different groups; and predicting chroma samples in the CU based on different classified linear models. Wherein Threshold may be average value of the neighboring reconstructed luma samples. Note the number of classes (2) can be extended to multiple classes by increasing the number of Threshold (e.g., equally divided based on min/max of neighboring reconstructed (down-sampled) luma samples, fixed or signaled/switched in SPS/DPS/VPS/SEI/APS/PPS/PH/SH/Region/CTU/CU/Sub-block/Sample levels).

In one example, instead of MMLM luma DC intensity, the filtered values of FLM/GLM apply on neighboring luma samples are used for classification. For example, if 1-tap (1, −1) GLM is applied, average AC values are used (physical meaning). The processing can be: classifying neighboring reconstructed luma-chroma sample pairs into K groups based on one or more filter shapes, one or more filtered values, and K−1 Threshold Ti; deriving different MLR models for different groups, wherein the deriving process may be GLM simplified, i.e., with the above pre-operations to reduce the number of taps; classifying luma-chroma sample pairs inside the CU (internal luma-chroma sample pairs, wherein each of the internal luma-chroma sample pairs comprises an internal chroma sample value to be predicted with the derived linear model) into K groups similarly based on one or more filter shapes, one or more filtered values, and K−1 Threshold Ti; applying different linear models to the reconstructed luma samples in different groups; predicting chroma samples in the CU based on different classified linear models. Wherein Threshold can be predefined (e.g., 0, or can be a table) or signaled/switched in SPS/DPS/VPS/SEI/APS/PPS/PH/SH/Region/CTU/CU/Subblock/Sample levels). For example, Threshold can be the average AC value (filtered value) (2 groups), or equally divided based on min/max AC (K groups), of neighboring reconstructed (can be downsampled) luma samples.

It is also proposed to combine GLM with ELM classifier. As shown in FIG. 15, one filter shape (e.g., 1-tap) may be selected to calculate edge strengths. The direction is determined as a direction along which a sample difference between samples of the current and N neighboring samples (e.g., all 6 luma samples) is calculated. For example, the filter (shape [1, 0, −1; 1, 0, −1]) at the upper middle in FIG. 15 indicates a horizontal direction since a sample difference may be calculated between samples in the horizontal direction, while the filter below it (shape [1, 2, 1; −1, −2, −1]) indicates a vertical direction since a sample difference may be calculated between samples in the vertical direction. The positive and negative coefficients in each of the filters enable the calculation of the sample differences. The processing may then comprise: calculating one edge strength by the filtered value (e.g., equivalent); quantizing the edge strength into M segments by M−1 thresholds Ti; using K classes to classify the current sample. (e.g., K==M); deriving different MLR models for different groups, wherein the deriving process may be GLM simplified, i.e., with the above pre-operations to reduce the number of taps; classifying luma-chroma sample pairs inside the CU into K groups; applying different MLR models to the reconstructed luma samples in different groups; and predicting chroma samples in the CU based on different classified MLR models. Please note that the filter shape used for classification can be the same or different with the filter shape used for MLR prediction. Both and the number of thresholds M−1, the thresholds values Ti, can be fixed or signaled/switched in SPS/DPS/VPS/SEI/APS/PPS/PH/SH/Region/CTU/CU/Subblock/Sample levels. Moreover, other classifiers/combined-classifiers as discussed in ELM can also be used for GLM.

If classified samples in one group are less than a number (e.g., predefined 4), default values mentioned when discussing the matrix derivation for the MLR model can be applied for the group parameters ($\alpha_i$, $\beta$). If the corresponding neighboring reconstructed samples are not available with respect to the selected LM modes, default values can be applied. For example, when MMLM_L mode is selected but left samples are not valid.

Several methods relate to simplification for GLM are introduced as follows for further improving coding efficiency.

The matrix/parameter derivation in FLM requires floating-point operation (e.g., division in closed-form), which is expensive for decoder hardware, so a fixed-point design is required. For 1-tap GLM case, it can be taken as modified luma reconstructed sample generation of CCLM (e.g., horizontal gradient direction, from CCLM [1, 2, 1; 1, 2, 1]/8 to GLM [−1, 0, 1; −1, 0, 1]), the original CCLM process can be reused for GLM, including fixed-point operation, MDLM downsampling, division table, applied size restriction, min-max approximation, and scale adjustment. For all items, 1-tap GLM can have its own configurations or share the same design as CCLM. For example, using simplified min-max method to derive the parameters (instead of LMS), and combined with scale adjustment after GLM model is derived.

This section takes typical case reference samples (up 1 row and left 1 column) for example. Note as in FIG. 14, extended reconstructed region can also use the simplification with the same spirit, and may be with syntax indicating the specific region (like MDLM, MRL).

Please note that the following aspects can be combined and applied jointly. For example, combining reference sample down-sampling and division table to perform the division process.

When classification (MMLM/ELM) is applied, each group can apply the same or different simplification operation. For example, samples for each group are padded respectively to the target sample number before applying right shift, and then apply the same derivation process, same division table.

Fixed-Point Implementation

The 1-tap case can reuse the CCLM design, dividing by n may be implemented by right shift, dividing by $A_2$ may be implemented by a LUT. The integerization parameters, including $n_\alpha$, $N_{A_1}$, $N_{A_2}$, $r_{A_1}$, $r_{A_2}$, $n_{table}$ involved in the integerization design of LMS CCLM and intermediate parameters for deriving the linear model (equations (19)-(20)) can be the same as CCLM or have different values, to have more precision. The integerization parameters can be predefined or signaled/switched in SPS/DPS/VPS/SEI/APS/PPS/PH/SH/Region/CTU/CU/Subblock/Sample levels, can be conditioned on sequence bitdepth. For example, $n_{table}$= bitdepth+4.

MDLM Down-Sample

When GLM is combined with MDLM, the existed total samples used for parameter derivation may not be power-of-2 values, and need padding to power-of-2 to replace division with right shift operation. For example, for an 8×4 chroma CU, MDLM needs W+H=12 samples, with MDLM_T only 8 samples are available (reconstructed), then downsampled 4 samples (0, 2, 4, 6) may be padded equally. Codes for implementing such operations are shown as follows:

```
int targetSampNum = 1 << ( floorLog2( existSampNum − 1 ) + 1 );
if (targetSampNum != existSampNum)//if existSampNum not a value of power of 2
{
  xPadMdlmTemplateSample;
}
int step = (int)(existSampNum / sampNumToBeAdd);
for (int i = 0; i < sampNumToBeAdd; i++)
{
  pTempSrc[i] = pSrc[i * step];
  pTempCur[i] = pCur[i * step];
}
```

Other padding method like repetitive/mirror padding with respect to last neighboring samples (rightmost/lowermost) can also be applied.

The padding method for GLM can be the same or different with that of CCLM.

Note in ECM version, an 8×4 chroma CU MDLM_T/MDLM_L needs 2T/2L=16/8 samples respectively, in such case, same padding method can be applied to meet the target power-of-2 sample number.

Division LUT

Division LUT proposed for CCLM/LIC (Local Illumination Compensation) in known standard development like AVC/HEVC/AV1/VVC/AVS can be used for GLM division. For example, reusing the LUT in JCTVC-10166 for bit-depth=10 case (Table 4). The division LUT can be different from CCLM. For example, CCLM uses min-max with DivTable as in equation 5, but GLM uses 32-entries LMS division LUT as in Table 5.

When GLM is combined with MMLM, the meanL values may not always be positive (e.g., using filtered/gradient values to classify groups), so sgn (meanL) needs to be extracted, and use abs (meanL) to look-up the division LUT. Note division LUT used for MMLM classification and parameter derivation can be different. For example, using lower precision LUT (as the LUT in min-max) for mean classification, and using higher precision LUT (as in the LMS) for parameter derivation.

Size Restriction and Latency Constraint

Similar to the CCLM design, some size restrictions can be applied for ELM/FLM/GLM. For example, same constraint for luma-chroma latency in dual tree may be applied.

The size restriction can be according to the CU area/width/height/depth. The threshold can be predefined or signaled in SPS/DPS/VPS/SEI/APS/PPS/PH/SH/Region/CTU/CU/Subblock/Sample levels. For example, the predefined threshold may be 128 for chroma CU area.

In one example, the at least one pre-operation is performed in response to determining that the video block meets an enabling threshold, wherein the enabling threshold is associated with area, width, height or partition depth of the video block. Specifically, the enabling threshold may define a minimum or maximum area, width, height or partition depth of the video block. As understood by one skilled in the art, the video block may comprise a current chroma block and its collocated luma block. It is also proposed to apply the above enabling threshold for the current chroma block and its collocated luma block jointly. For example, the at least one pre-operation is performed in response to determining the enabling threshold is met for both the current chroma block and its collocated luma block.

Line Buffer Reduction

Similar to the CCLM design, if the collocated luma area of the current chroma CU contains the 1st row inside one CTU, the top template samples generation can be limited to 1 row, to reduce CTU row line buffer storage. Note that only one luma line (general line buffer in intra prediction) is used to make the downsampled luma samples when the upper reference line is at the CTU boundary.

For example, in FIG. 13, if the collocated luma area of the current chroma CU contains the 1st row inside one CTU, top template can be limited to only use 1 row (but not 2) for parameter derivation (other CUs can still use 2 rows). This saves luma sample line buffer storage when processing CTU row by row at decoder hardware. Several methods can be used to achieve the line buffer reduction. Note the example of limited "1" row can be extended to N rows with similar operations. Similarly. 2-tap or multi-tap can also apply such operations. When applying multi-tap, chroma samples may also need to apply operations.

For example, take the 1-tap filter [1, 0, −1; 1, 0, −1] shown in FIG. 15 as an example for illustration. This filter can be reduced to [0, 0, 0; 1, 0, −1], i.e., only use below row coefficients. Alternatively, the limited upper row luma samples can be padded (repetitive, mirror, 0, meanL, meanC . . . etc.) from the bellow row luma samples.

Take an example where N=4, that is, the video block is at a top boundary of a current CTU, while top 4 rows of neighboring luma sample values and corresponding chroma sample values are used for deriving the linear model. Please note that the corresponding chroma sample values may refer to corresponding top 4 rows of neighboring chroma sample values (for example, for the YUV 4:4:4 format). Alternatively, the corresponding chroma sample values may refer to corresponding top 2 rows of neighboring chroma sample values (for example, for the YUV 4:2:0 format). In this case, the top 4 rows of neighboring luma sample values and corresponding chroma sample values may be divided into two regions-a first region comprising valid sample values (for example, the one nearest row of luma sample values and corresponding chroma sample values) and a second region comprising invalid sample values (for example, the other three rows of luma sample values and corresponding chroma sample values). Then coefficients of the filter corresponding to sample positions not belonging to the first region may be set as zeros, such that only sample values from the first region are used for calculating the sample differences. For example, as discussed above, in this case the filter [1, 0, −1; 1, 0, −1] can be reduced to [0, 0, 0; 1, 0, −1]. Alternatively, the nearest sample values in the first region may be padded to the second region, such that the padded sample values may be used to calculate the sample differences.

Fusion of Chroma Intra Prediction Modes

In one example, since GLM can be taken as one special CCLM mode, the fusion design can be reused or have its own way. Multiple (two or more) weights can be applied to generation the final predictor. For example, $$pred = (w0 * pred0 + w1 * pred1 + (1 \ll (\text{shift} - 1))) \gg \text{shift}$$

wherein pred0 is the predictor based on non-LM mode, while pred1 is the predictor based on GLM, or pred0 is the predictor based on one of CCLM (including all MDLM/MMLM), while pred1 is the predictor based on GLM, or pred0 is the predictor based on GLM, while pred1 is the predictor based on GLM.

Different I/P/B slices can have different designs for weights, w0 and w1, depending on if neighboring blocks is coded with CCLM/GLM/other coding mode or the block size/width/height.

For example, the designs for weights can be determined by the intra prediction mode of adjacent chroma blocks and shift is set equal to 2. Specifically, when the above and left adjacent blocks are both coded with LM modes, then {w0, w1}={1, 3}; when the above and left adjacent blocks are both coded with non-LM modes, then {w0, w1}={3, 1}; otherwise, {w0, w1}={2, 2}. For non-I slices, w0 and w1 can both be set equal to 2.

For the syntax design, if a non-LM mode is selected, one flag is signaled to indicate whether the fusion is applied.

Figure 16:
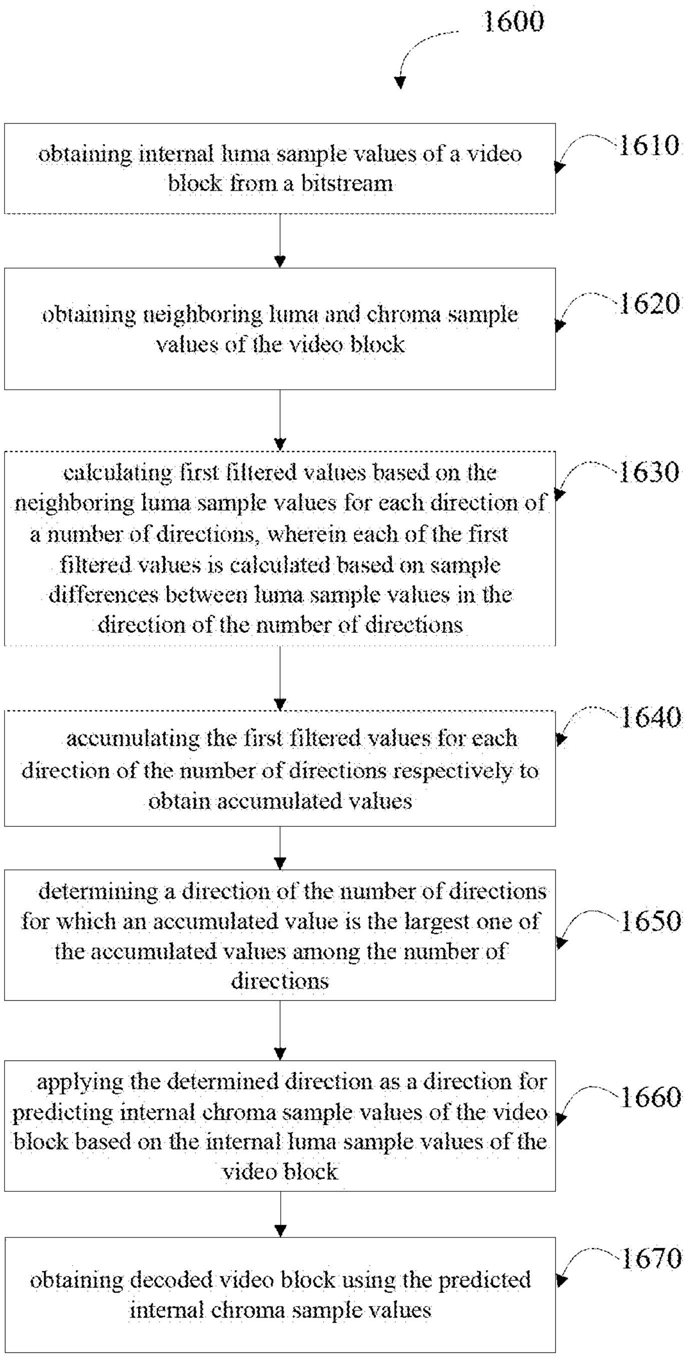
FIG. 16 illustrates a workflow of a method for decoding video data according to one or more aspects of the present disclosure.

FIG. 16 illustrates a workflow of a method 1600 for decoding video data according to one or more aspects of the present disclosure.

At step 1610, the method 1600 comprises obtaining internal luma sample values of a video block (e.g., a CU comprising a luma block and/or a chroma block) from a bitstream.

At step 1620, the method 1600 comprises obtaining neighboring luma and chroma sample values of the video block.

At step 1630, the method 1600 comprises calculating first filtered values based on the neighboring luma sample values for each direction of a number of directions, wherein each of the first filtered values is calculated based on sample differences between luma sample values in the direction of the number of directions.

At step 1640, the method 1600 comprises accumulating the first filtered values for each direction of the number of directions respectively to obtain accumulated values.

At step 1650, the method 1600 comprises determining a direction of the number of directions for which an accumulated value is the largest one of the accumulated values among the number of directions.

At step 1660, the method 1600 comprises applying the determined direction as a direction for predicting internal chroma sample values of the video block based on the internal luma sample values of the video block.

At step 1670, the method 1600 comprises obtaining decoded video block using the predicted internal chroma sample values.

In one example, the method 1600 further comprising performing, based on the determined direction, at least one pre-operation to the neighboring luma sample values and to the internal luma sample values of the video block, to obtain pre-operated neighboring and internal luma sample values; deriving a linear model by using the pre-operated neighboring luma sample values and the neighboring chroma sample values; and predicting each of the internal chroma sample values of the video block by applying the linear model to one or more corresponding pre-operated internal luma sample values for that internal chroma sample value.

In one example, the method 1600 further comprises building a Histogram of Gradients (HoG) based on the accumulated values for the number of directions; and determining the direction for predicting internal chroma sample values of the video block based on the HoG.

In one example, the linear model comprises: a simple linear regression (SLR) model; or a multiple linear regression (MLR) model.

In one example, the linear model is a MLR model, and wherein deriving the MLR model comprises deriving multiple scale parameters $\alpha$ and an optional offset parameter $\beta$ by using the pre-operated neighboring luma sample values and the neighboring chroma sample values, wherein performing the at least one pre-operation comprises calculating second filtered values based on the neighboring and internal luma sample values, and wherein at least one of the multiple scale parameters $\alpha$ is derived by utilizing the second filtered values.

In one example, each of the second filtered values is obtained based on sample differences between luma sample values in the determined direction.

In one example, the first filtered values and the second filtered values are calculated with the same filter, or the first filtered values and the second filtered values are calculated with different filters.

In one example, each of the accumulated values is an accumulated value of absolute values of corresponding first filtered values.

Figure 17:
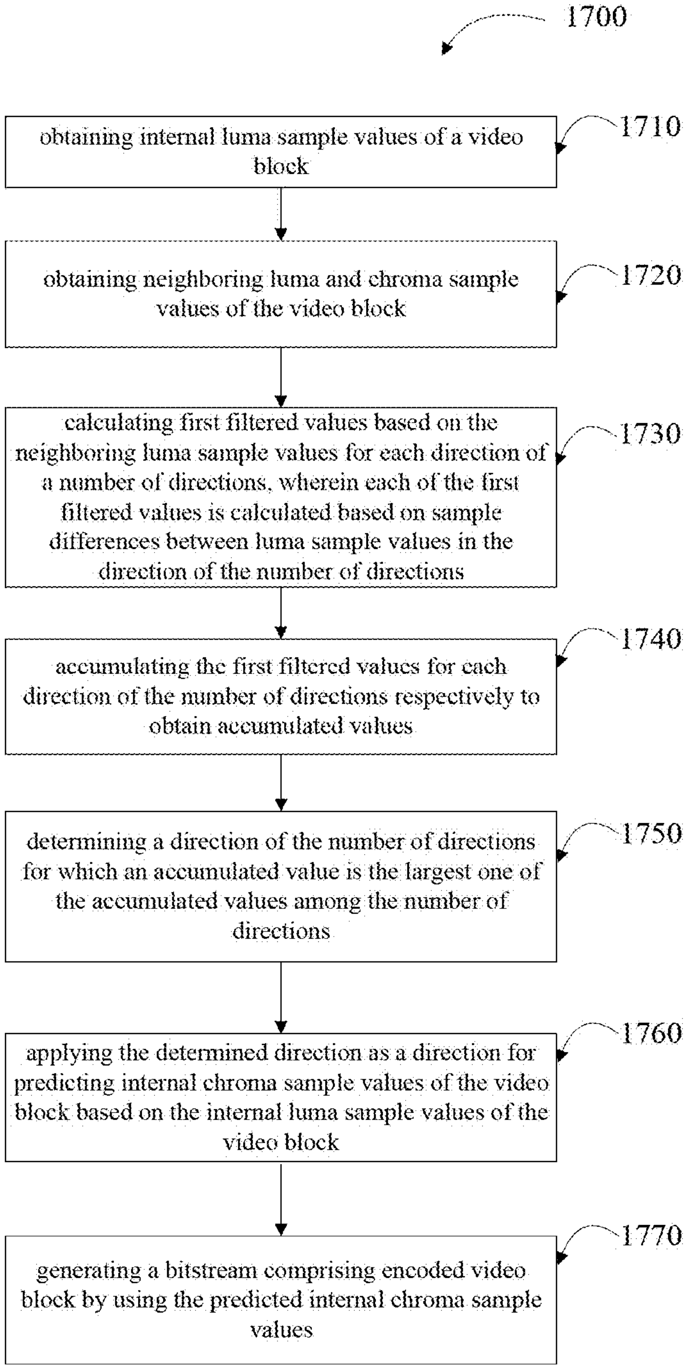
FIG. 17 illustrates a workflow of a method for encoding video data according to one or more aspects of the present disclosure.

FIG. 17 illustrates a workflow of a method 1700 for encoding video data according to one or more aspects of the present disclosure. Method 1700 may be similar to method 1600, and the processes or steps of method 1700 may correspond to that of method 1600.

At step 1710, the method 1700 comprises obtaining internal luma sample values of a video block (e.g., a CU comprising a luma block and/or a chroma block).

At step 1720, the method 1700 comprises obtaining neighboring luma and chroma sample values of the video block.

At step 1730, the method 1700 comprises calculating first filtered values based on the neighboring luma sample values for each direction of a number of directions, wherein each of the first filtered values is calculated based on sample differences between luma sample values in the direction of the number of directions.

At step 1740, the method 1700 comprises accumulating the first filtered values for each direction of the number of directions respectively to obtain accumulated values.

At step 1750, the method 1700 comprises determining a direction of the number of directions for which an accumulated value is the largest one of the accumulated values among the number of directions.

At step 1760, the method 1700 comprises applying the determined direction as a direction for predicting internal chroma sample values of the video block based on the internal luma sample values of the video block.

At step 1770, the method 1700 comprises generating a bitstream comprising encoded video block by using the predicted internal chroma sample values.

In one example, the method 1700 further comprising performing, based on the determined direction, at least one pre-operation to the neighboring luma sample values and to the internal luma sample values of the video block, to obtain pre-operated neighboring and internal luma sample values; deriving a linear model by using the pre-operated neighboring luma sample values and the neighboring chroma sample values; and predicting each of the internal chroma sample values of the video block by applying the linear model to one or more corresponding pre-operated internal luma sample values for that internal chroma sample value.

In one example, the method 1700 further comprises building a Histogram of Gradients (HoG) based on the accumulated values for the number of directions; and determining the direction for predicting internal chroma sample values of the video block based on the HoG.

In one example, the linear model comprises: a simple linear regression (SLR) model; or a multiple linear regression (MLR) model.

In one example, the linear model is a MLR model, and wherein deriving the MLR model comprises deriving multiple scale parameters $\alpha$ and an optional offset parameter $\beta$ by using the pre-operated neighboring luma sample values and the neighboring chroma sample values, wherein performing the at least one pre-operation comprises calculating second filtered values based on the neighboring and internal luma sample values, and wherein at least one of the multiple scale parameters $\alpha$ is derived by utilizing the second filtered values.

In one example, each of the second filtered values is obtained based on sample differences between luma sample values in the determined direction.

In one example, the first filtered values and the second filtered values are calculated with the same filter, or the first filtered values and the second filtered values are calculated with different filters.

In one example, each of the accumulated values is an accumulated value of absolute values of corresponding first filtered values.

Figure 18:
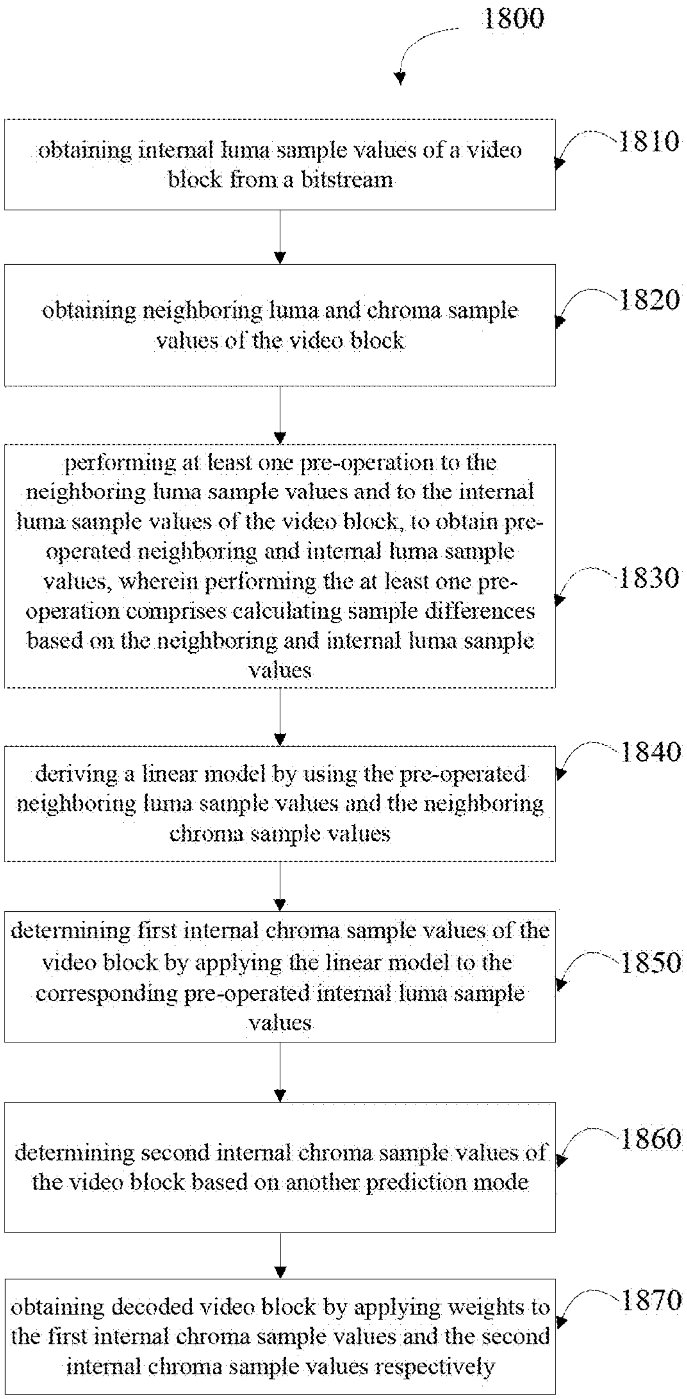
FIG. 18 illustrates a workflow of a method for decoding video data according to one or more aspects of the present disclosure.

FIG. 18 illustrates a workflow of a method 1800 for decoding video data according to one or more aspects of the present disclosure.

At step 1810, the method 1800 comprises obtaining internal luma sample values of a video block (e.g., a CU comprising a luma block and/or a chroma block) from a bitstream.

At step 1820, the method 1800 comprises obtaining neighboring luma and chroma sample values of the video block.

At step 1830, the method 1800 comprises performing at least one pre-operation to the neighboring luma sample values and to the internal luma sample values of the video block, to obtain pre-operated neighboring and internal luma sample values, wherein performing the at least one pre-operation comprises calculating sample differences based on the neighboring and internal luma sample values.

At step 1840, the method 1800 comprises deriving a linear model by using the pre-operated neighboring luma sample values and the neighboring chroma sample values.

At step 1850, the method 1800 comprises determining first internal chroma sample values of the video block by applying the linear model to the corresponding pre-operated internal luma sample values.

At step 1860, the method 1800 comprises determining second internal chroma sample values of the video block based on another prediction mode.

At step 1870, the method 1800 comprises obtaining decoded video block by applying weights to the first internal chroma sample values and the second internal chroma sample values respectively.

In one example, the another prediction mode comprising one of the Cross-Component Linear Mode (CCLM), the Multi-Model Linear Mode (MMLM) and non-LM mode.

In one example, the non-LM mode comprising one of the intra angular mode and the planar mode.

In one example, the weights are different for I slices, P slices and B slices.

In one example, the weights are determined based on the prediction mode of the neighboring video blocks and/or the size of the video block.

Figure 19:
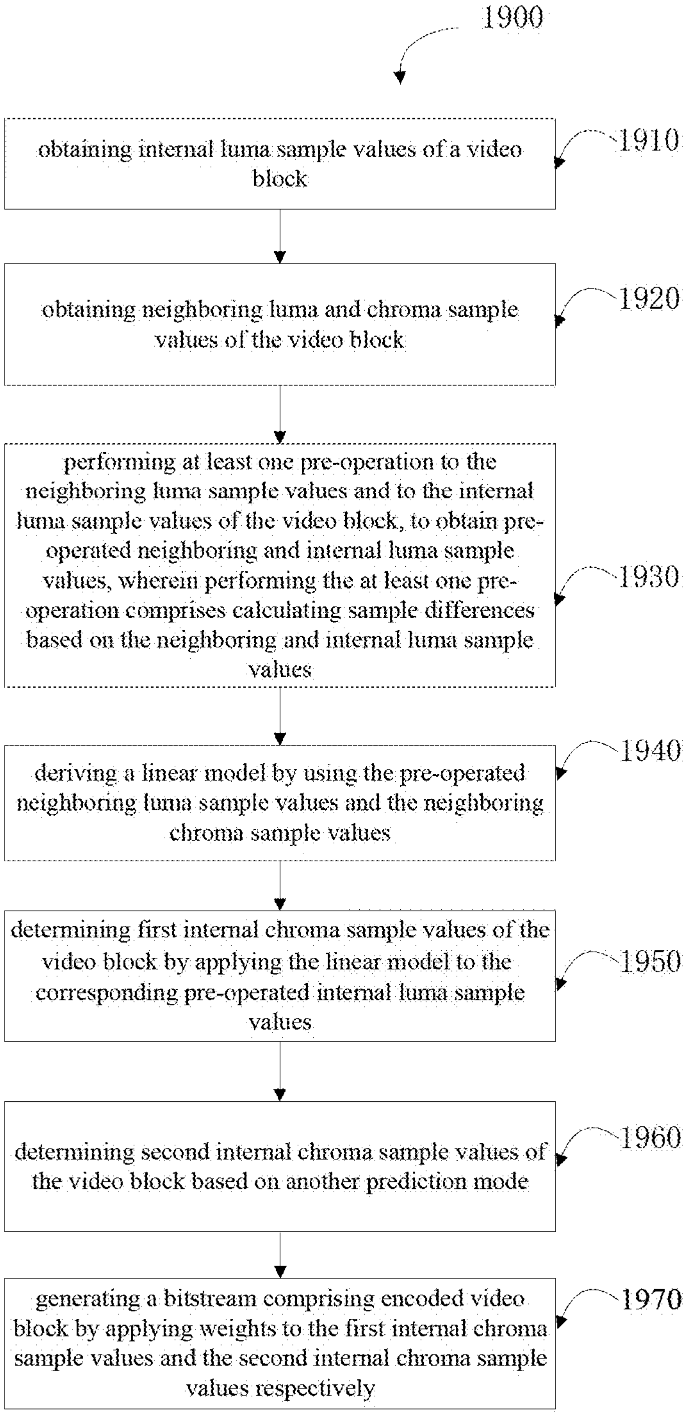
FIG. 19 illustrates a workflow of a method for encoding video data according to one or more aspects of the present disclosure.

FIG. 19 illustrates a workflow of a method 1900 for encoding video data according to one or more aspects of the present disclosure. Method 1900 may be similar to method 1800, and the processes or steps of method 1900 may correspond to that of method 1800.

At step 1910, the method 1900 comprises obtaining internal luma sample values of a video block (e.g., a CU comprising a luma block and/or a chroma block).

At step 1920, the method 1900 comprises obtaining neighboring luma and chroma sample values of the video block.

At step 1930, the method 1900 comprises performing at least one pre-operation to the neighboring luma sample values and to the internal luma sample values of the video block, to obtain pre-operated neighboring and internal luma sample values, wherein performing the at least one pre-operation comprises calculating sample differences based on the neighboring and internal luma sample values.

At step 1940, the method 1900 comprises deriving a linear model by using the pre-operated neighboring luma sample values and the neighboring chroma sample values.

At step 1950, the method 1900 comprises determining first internal chroma sample values of the video block by applying the linear model to the corresponding pre-operated internal luma sample values.

At step 1960, the method 1900 comprises determining second internal chroma sample values of the video block based on another prediction mode.

At step 1970, the method 1900 comprises generating a bitstream comprising encoded video block by applying weights to the first internal chroma sample values and the second internal chroma sample values respectively.

In one example, the another prediction mode comprising one of the Cross-Component Linear Mode (CCLM), the Multi-Model Linear Mode (MMLM) and non-LM mode.

In one example, the non-LM mode comprising one of the intra angular mode and the planar mode.

In one example, the weights are different for I slices, P slices and B slices.

In one example, the weights are determined based on the prediction mode of the neighboring video blocks and/or the size of the video block.

Figure 20:
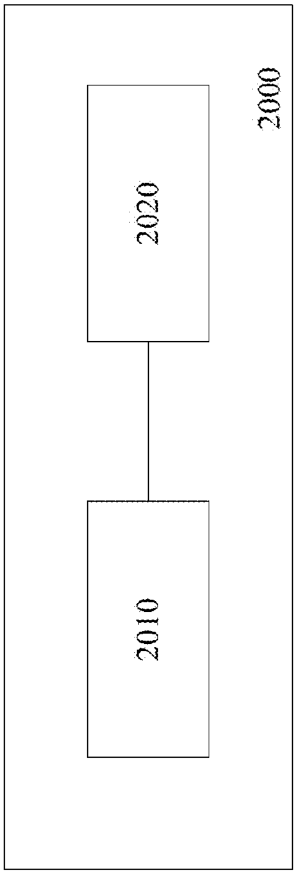
FIG. 20 illustrates an exemplary computing system according to one or more aspects of the present disclosure.

FIG. 20 illustrates an exemplary computing system 2000 according to one or more aspects of the present disclosure. The computing system 2000 may comprise at least one processor 2010. The computing system 2000 may further comprise at least one storage device 2020. The storage device 2020 may store computer-executable instructions that, when executed, cause the processor 2010 to perform the steps of methods described above. The processor 2010 may be a general-purpose processor, or may also be implemented as a combination of computing devices, e.g., a combination of a DSP and a microprocessor, multiple microprocessors, one or more microprocessors in conjunction with a DSP core, or any other such configuration. The storage device 2020 may store the input data, output data, data generated by processor 2010, and/or instructions executed by processor 2010.

It should be appreciated that the storage device 2020 may store computer-executable instructions that, when executed, cause the processor 2010 to perform any operations according to the embodiments of the present disclosure.

The embodiments of the present disclosure may be embodied in a computer-readable medium such as non-transitory computer-readable medium. The non-transitory computer-readable medium may comprise instructions that, when executed, cause one or more processors to perform any operations according to the embodiments of the present disclosure. For example, the instructions, when executed, may cause one or more processors to receive a bitstream and perform the decoding operations as described above. For another example, the instructions, when executed, may cause one or more processors to perform the encoding operations and transmit a bitstream comprising the encoded video information associated with the predicted chroma sample as described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the methods described above may be implemented in various approaches. These modules may be implemented as hardware, software, or a combination thereof. Moreover, any of these modules may be further functionally divided into sub-modules or combined together.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for decoding video data, comprising:

obtaining internal luma sample values of a video block from a bitstream;

obtaining neighboring luma and chroma sample values of the video block;

calculating first filtered values based on the neighboring luma sample values for each direction of a number of directions, wherein each of the first filtered values is calculated based on sample differences between luma sample values in the direction of the number of directions;

accumulating the first filtered values for each direction of the number of directions respectively to obtain accumulated values;

determining a direction of the number of directions for which an accumulated value is the largest one of the accumulated values among the number of directions;

applying the determined direction as a direction for predicting internal chroma sample values of the video block based on the internal luma sample values of the video block; and obtaining decoded video block using the predicted internal chroma sample values.

2. The method of claim 1, further comprising:

performing, based on the determined direction, at least one pre-operation to the neighboring luma sample values and to the internal luma sample values of the video block, to obtain pre-operated neighboring and internal luma sample values;

deriving a linear model by using the pre-operated neighboring luma sample values and the neighboring chroma sample values; and predicting each of the internal chroma sample values of the video block by applying the linear model to one or more corresponding pre-operated internal luma sample values for that internal chroma sample value.

3. The method of claim 1, further comprising:

building a Histogram of Gradients (HoG) based on the accumulated values for the number of directions; and determining the direction for predicting internal chroma sample values of the video block based on the HoG.

4. The method of claim 2, wherein the linear model comprises:

a simple linear regression (SLR) model; or a multiple linear regression (MLR) model.

5. The method of claim 4, wherein the linear model is a MLR model, and wherein deriving the MLR model comprises deriving multiple scale parameters $\alpha$ and an optional offset parameter 8 by using the pre-operated neighboring luma sample values and the neighboring chroma sample values, wherein performing the at least one pre-operation comprises calculating second filtered values based on the neighboring and internal luma sample values, and wherein at least one of the multiple scale parameters $\alpha$ is derived by utilizing the second filtered values.

6. The method of claim 5, wherein each of the second filtered values is obtained based on sample differences between luma sample values in the determined direction.

7. The method of claim 5, wherein the first filtered values and the second filtered values are calculated with the same filter, or the first filtered values and the second filtered values are calculated with different filters.

8. The method of claim 1, wherein each of the accumulated values is an accumulated value of absolute values of corresponding first filtered values.

9. The method of claim 1, wherein chroma format of the video data is 4:2:2 or 4:4:4.

10. A computer system, comprising:

one or more processors; and one or more storage devices storing computer-executable instructions that, when executed, cause the one or more processors to:

obtain internal luma sample values of a video block from a bitstream;

obtain neighboring luma and chroma sample values of the video block;

calculate first filtered values based on the neighboring luma sample values for each direction of a number of directions, wherein each of the first filtered values is calculated based on sample differences between luma sample values in the direction of the number of directions;

accumulate the first filtered values for each direction of the number of directions respectively to obtain accumulated values;

determine a direction of the number of directions for which an accumulated value is the largest one of the accumulated values among the number of directions;

apply the determined direction as a direction for predicting internal chroma sample values of the video block based on the internal luma sample values of the video block; and obtain decoded video block using the predicted internal chroma sample values.

11. The computer system of claim 10, wherein the computer-executable instructions are further executed to cause the one or more processors to:

perform, based on the determined direction, at least one pre-operation to the neighboring luma sample values and to the internal luma sample values of the video block, to obtain pre-operated neighboring and internal luma sample values;

derive a linear model by using the pre-operated neighboring luma sample values and the neighboring chroma sample values; and predict each of the internal chroma sample values of the video block by applying the linear model to one or more corresponding pre-operated internal luma sample values for that internal chroma sample value.

12. The computer system of claim 10, wherein the computer-executable instructions are further executed to cause the one or more processors to:

build a Histogram of Gradients (HoG) based on the accumulated values for the number of directions; and determine the direction for predicting internal chroma sample values of the video block based on the HoG.

13. The computer system of claim 11, wherein the linear model comprises:

a simple linear regression (SLR) model; or a multiple linear regression (MLR) model.

14. The computer system of claim 13, wherein the linear model is a MLR model, and wherein deriving the MLR model comprises deriving multiple scale parameters α and an optional offset parameter 8 by using the pre-operated neighboring luma sample values and the neighboring chroma sample values, wherein performing the at least one pre-operation comprises calculating second filtered values based on the neighboring and internal luma sample values, and wherein at least one of the multiple scale parameters α is derived by utilizing the second filtered values.

15. The computer system of claim 14, wherein each of the second filtered values is obtained based on sample differences between luma sample values in the determined direction.

16. The computer system of claim 14, wherein the first filtered values and the second filtered values are calculated with the same filter, or the first filtered values and the second filtered values are calculated with different filters.

17. The computer system of claim 10, wherein each of the accumulated values is an accumulated value of absolute values of corresponding first filtered values.

18. A non-transitory computer readable storage medium, storing instructions and a bitstream, wherein the instructions, which when executed by a computing device having one or more processors, cause the one or more processors to perform operations to generate the bitstream, the operations comprising:

obtaining internal luma sample values of a video block;

obtaining neighboring luma and chroma sample values of the video block;

calculating first filtered values based on the neighboring luma sample values for each direction of a number of directions, wherein each of the first filtered values is calculated based on sample differences between luma sample values in the direction of the number of directions;

accumulating the first filtered values for each direction of the number of directions respectively to obtain accumulated values;

determining a direction of the number of directions for which an accumulated value is the largest one of the accumulated values among the number of directions;

applying the determined direction as a direction for predicting internal chroma sample values of the video block based on the internal luma sample values of the video block; and generating the bitstream comprising encoded video block by using the predicted internal chroma sample values, wherein the bitstream is to be decoded by the decoding method according to claim 1.

19. A method for storing a bitstream on a non-transitory computer readable medium, comprising:

obtaining, by an encoder, internal luma sample values of a video block;

obtaining, by the encoder, neighboring luma and chroma sample values of the video block;

calculating, by the encoder, first filtered values based on the neighboring luma sample values for each direction of a number of directions, wherein each of the first filtered values is calculated based on sample differences between luma sample values in the direction of the number of directions;

accumulating, by the encoder, the first filtered values for each direction of the number of directions respectively to obtain accumulated values;

determining, by the encoder, a direction of the number of directions for which an accumulated value is the largest one of the accumulated values among the number of directions;

applying, by the encoder, the determined direction as a direction for predicting internal chroma sample values of the video block based on the internal luma sample values of the video block:

generating, by the encoder, a bitstream comprising encoded video block by using the predicted internal chroma sample values; and storing, by the encoder, the bitstream, wherein the bitstream is to be decoded by the decoding method according to claim 1.

* * * * *